US010447543B2

(12) United States Patent
Rovner et al.

(10) Patent No.: US 10,447,543 B2
(45) Date of Patent: Oct. 15, 2019

(54) ADAPTIVE PRIVATE NETWORK (APN) BANDWITH ENHANCEMENTS

(71) Applicant: Talari Networks Incorporated, San Jose, CA (US)

(72) Inventors: Sonia Kiang Rovner, Chapel Hill, NC (US); Wei Huang, Cary, NC (US); Wai Yee Lui, Chapel Hill, NC (US); Jigar Mehta, Morrisville, NC (US); Justin Allen Patterson, Morrisville, NC (US); Todd Martin, Campbell, CA (US)

(73) Assignee: Talari Networks Incorporated, San Jose, CA (US)

( * ) Notice: Subject to any disclaimer, the term of this patent is extended or adjusted under 35 U.S.C. 154(b) by 112 days.

(21) Appl. No.: 15/409,019

(22) Filed: Jan. 18, 2017

(65) Prior Publication Data

US 2017/0207976 A1    Jul. 20, 2017

Related U.S. Application Data

(60) Provisional application No. 62/372,021, filed on Aug. 8, 2016, provisional application No. 62/280,356, filed
(Continued)

(51) Int. Cl.
*H04L 12/24* (2006.01)
*H04L 12/751* (2013.01)
(Continued)

(52) U.S. Cl.
CPC ........ *H04L 41/0896* (2013.01); *H04L 41/083* (2013.01); *H04L 41/0813* (2013.01);
(Continued)

(58) Field of Classification Search
CPC . H04L 41/0813; H04L 41/0896; H04L 43/08; H04L 43/0876; H04L 43/0882;
(Continued)

(56) References Cited

U.S. PATENT DOCUMENTS

| 6,721,290 B1 | 4/2004 | Kondylis et al. |
| 7,426,181 B1 | 9/2008 | Feroz et al. |

(Continued)

OTHER PUBLICATIONS

Non-Final Office Action for U.S. Appl. No. 14/481,335 (dated Apr. 1, 2019).
(Continued)

*Primary Examiner* — Kevin C. Harper
(74) *Attorney, Agent, or Firm* — Jenkins, Wilson, Taylor & Hunt P.A.

(57) ABSTRACT

Techniques are described to automatically activate and deactivate standby backup paths in response to changing bandwidth requirements in an adaptive private network (APN). The APN is configured with one or more regular active wide area network (WAN) links in an active mode and an on-demand WAN link in a standby mode. The on-demand WAN link is activated to supplement the conduit bandwidth when an available bandwidth of the conduit falls below a pre-specified trigger bandwidth threshold and the conduit bandwidth usage exceeds a usage threshold of a bandwidth of the conduit that is being supplied by the active paths ($BW_C$). The on-demand WAN link is deactivated to standby mode when an available bandwidth of the conduit is above the pre-specified trigger bandwidth threshold and the conduit bandwidth usage drops below the usage threshold of $BW_C$. Techniques for adaptive and active bandwidth testing of WAN links in an APN are also described.

13 Claims, 14 Drawing Sheets

Related U.S. Application Data on Jan. 19, 2016, provisional application No. 62/280,448, filed on Jan. 19, 2016, provisional application No. 62/280,381, filed on Jan. 19, 2016, provisional application No. 62/371,998, filed on Aug. 8, 2016.

(51) Int. Cl.

| | | |
|---|---|---|
| *H04L 12/753* | (2013.01) | |
| *H04L 12/803* | (2013.01) | |
| *H04M 1/725* | (2006.01) | |
| *H04L 12/741* | (2013.01) | |
| *H04L 12/743* | (2013.01) | |
| *H04L 12/935* | (2013.01) | |
| *H04L 29/12* | (2006.01) | |
| *H04L 12/26* | (2006.01) | |
| *H04L 12/707* | (2013.01) | |

(52) U.S. Cl.
CPC .............. *H04L 41/12* (2013.01); *H04L 43/08* (2013.01); *H04L 45/02* (2013.01); *H04L 45/22* (2013.01); *H04L 45/48* (2013.01); *H04L 45/54* (2013.01); *H04L 45/7453* (2013.01); *H04L 47/125* (2013.01); *H04L 49/3063* (2013.01); *H04L 61/6022* (2013.01); *H04M 1/72519* (2013.01); *H04L 43/0829* (2013.01); *H04L 43/0876* (2013.01); *H04L 43/0888* (2013.01); *H04L 43/0894* (2013.01); *H04L 43/10* (2013.01); *H04L 43/16* (2013.01); *H04L 43/50* (2013.01)

(58) Field of Classification Search
CPC ....... H04L 43/16; H04L 45/12; H04L 45/121; H04L 45/22; H04L 45/24; H04L 45/245
See application file for complete search history.

(56) References Cited

U.S. PATENT DOCUMENTS

| | | | |
|---|---|---|---|
| 7,433,943 | B1 | 10/2008 | Ford |
| 7,664,048 | B1 | 2/2010 | Yung et al. |
| 7,801,030 | B1 | 9/2010 | Aggarwal et al. |
| 8,125,907 | B2 | 2/2012 | Averi et al. |
| 8,274,891 | B2 | 9/2012 | Averi et al. |
| 8,452,846 | B2 | 5/2013 | Fredette et al. |
| 8,644,164 | B2 | 2/2014 | Averi et al. |
| 8,775,547 | B2 | 7/2014 | Fredette et al. |
| 9,069,727 | B2 | 6/2015 | Martin et al. |
| 9,100,338 | B2 | 8/2015 | Averi et al. |
| 9,392,061 | B2 | 7/2016 | Fredette et al. |
| 10,341,237 | B2 | 7/2019 | Averi et al. |
| 2002/0027885 | A1* | 3/2002 | Ben-Ami ........... H04Q 11/0421 370/254 |
| 2004/0064469 | A1 | 4/2004 | Takahashi et al. |
| 2005/0102390 | A1 | 5/2005 | Peterson et al. |
| 2006/0239271 | A1* | 10/2006 | Khasnabish ........... H04L 45/00 370/395.21 |
| 2007/0248077 | A1* | 10/2007 | Mahle, Jr. .............. H04L 12/66 370/352 |
| 2007/0286090 | A1 | 12/2007 | Rusmisel et al. |
| 2007/0297332 | A1 | 12/2007 | Broberg et al. |
| 2009/0147806 | A1 | 6/2009 | Brueckheimer |
| 2011/0007631 | A1 | 1/2011 | Raina et al. |
| 2012/0314578 | A1 | 12/2012 | Averi et al. |
| 2013/0077701 | A1* | 3/2013 | Tsien ................... G06F 1/3253 375/259 |
| 2013/0339101 | A1 | 12/2013 | Riley et al. |
| 2014/0173331 | A1 | 6/2014 | Martin et al. |
| 2015/0071067 | A1 | 3/2015 | Martin et al. |
| 2016/0006658 | A1 | 1/2016 | Averi et al. |
| 2016/0072706 | A1 | 3/2016 | Huang et al. |
| 2016/0179850 | A1 | 6/2016 | Martin et al. |
| 2016/0182305 | A1 | 6/2016 | Martin et al. |
| 2016/0182319 | A1 | 6/2016 | Martin et al. |
| 2016/0182327 | A1 | 6/2016 | Coleman, Jr. et al. |
| 2016/0197802 | A1 | 7/2016 | Schultz et al. |
| 2016/0345341 | A1* | 11/2016 | Oliver ................... H04W 4/029 |
| 2017/0026280 | A1* | 1/2017 | Yu .......................... H04L 45/28 |
| 2017/0055133 | A1* | 2/2017 | Dieselberg ............. H04W 4/08 |
| 2017/0207996 | A1 | 7/2017 | Lui et al. |

OTHER PUBLICATIONS

Applicant-Initiated Interview Summary for U.S. Appl. No. 14/481,335 (dated Mar. 22, 2019).

Notice of Allowance and Fee(s) Due for U.S. Appl. No. 15/647,924 (dated Feb. 19, 2019).

Applicant Initiated Interview Summary for U.S. Appl. No. 15/409,001 (dated Feb. 11, 2019).

Advisory Action for U.S. Appl. No. 15/409,001 (dated Feb. 4, 2019).

Final Office Action for U.S. Appl. No. 15/409,001 (dated Sep. 24, 2018).

Non-Final Office Action for U.S. Appl. No. 15/409,001 (dated Apr. 19, 2018).

Notice of Allowance and Fee(s) Due for U.S. Appl. No. 13/592,460 (dated Oct. 2, 2013).

Non-Final Office Action for U.S. Appl. No. 13/592,460 (dated May 24, 2013).

Non-Final Office Action for U.S. Appl. No. 15/409,001 (dated Apr. 4, 2019).

Applicant-Initiated Interview Summary for U.S. Appl. No. 15/409,001 (dated Aug. 14, 2019).

Final Office Action for U.S. Appl. No. 14/481,335 (dated Aug. 8, 2019).

\* cited by examiner

ADAPTIVE PRIVATE NETWORK (APN) BANDWITH ENHANCEMENTS

CROSS REFERENCE TO RELATED APPLICATIONS

The present application claims the benefit of U.S. Provisional Patent Application Ser. No. 62/372,021 titled "Adaptive Private Network (APN) Bandwidth Enhancements" filed Aug. 8, 2016; U.S. Provisional Patent Application Ser. No. 62/280,356 titled "Methods and Apparatus for Configuring a Standby WAN link in an Adaptive Private Network" filed Jan. 19, 2016; U.S. Provisional Patent Application Ser. No. 62/280,448 titled "Methods and Apparatus for Accessing Selectable Application Processing of Data Packets in an Adaptive Private Network" filed Jan. 19, 2016; U.S. Provisional Patent Application Ser. No. 62/280,381 titled "Methods and Apparatus for Accessing Dynamic Routing Information from Networks Coupled to a Wide Area Network (WAN) to Determine Optimized End-to-End Routing Paths" filed on Jan. 19, 2016; and U.S. Provisional Patent Application Ser. No. 62/371,998 titled "Applications and Integrated Firewall Design in an Adaptive Private Network (APN)" filed Aug. 8, 2016 which are incorporated by reference herein in their entirety.

The present application is also related to U.S. patent application Ser. No. 14/146,786 filed on Jan. 3, 2014 which issued as U.S. Pat. No. 9,100,338 entitled "Flow-Based Adaptive Private Network With Multiple Wan-Paths", which is a divisional of U.S. patent application Ser. No. 13/592,460 filed on Aug. 23, 2012 which issued as U.S. Pat. No. 8,644,164 entitled "Flow-Based Adaptive Private Network With Multiple WAN-Paths", which is a continuation of U.S. patent application Ser. No. 13/353,693 filed on Jan. 19, 2012 which issued as U.S. Pat. No. 8,274,891 entitled "Flow-Based Adaptive Private Network With Multiple WAN-Paths", which is a continuation of U.S. patent application Ser. No. 12/482,766 filed on Jun. 11, 2009 which issued as U.S. Pat. No. 8,125,907 entitled "Flow-Based Adaptive Private Network with Multiple WAN-Paths", all of which claim the benefit of U.S. Provisional Patent Application No. 61/060,846 entitled "Flow-based Adaptive Private Network with Multiple WAN-Paths" filed Jun. 12, 2008; U.S. patent application Ser. No. 14/291,776 filed on May 30, 2014 which issued as U.S. Pat. No. 9,392,061 entitled "Adaptive Private Network Asynchronous Distributed Shared Memory Services", which is a continuation of U.S. patent application Ser. No. 13/850,411 filed on Mar. 26, 2013 which issued as U.S. Pat. No. 8,775,547 entitled "Adaptive Private Network Asynchronous Distributed Shared Memory Services", and which is a continuation of U.S. patent application Ser. No. 13/208,825 filed on Aug. 12, 2011 which issued as U.S. Pat. No. 8,452,846 entitled "Adaptive Private Network Asynchronous Distributed Shared Memory Services", all of which claim the benefit of U.S. Provisional Patent Application Ser. No. 61/372,904 entitled "Adaptive Private Network Asynchronous Distributed Shared Memory Services" filed Aug. 12, 2010; U.S. patent application Ser. No. 13/719,433 filed on Dec. 19, 2012 which issued as U.S. Pat. No. 9,069,727 entitled "An Adaptive Private Network with Geographically Redundant Network Control Nodes"; U.S. patent application Ser. No. 14/019,723 filed on Sep. 6, 2013 and published as U.S. Patent Application No. 2015-0071067 A1 entitled "An Adaptive Private Network with Path Maximum Transmission Unit (MTU) Discovery Process"; U.S. patent application Ser. No. 14/481,335 filed on Sep. 9, 2014 and published as U.S. Patent Application No. 2016-0072706 A1 entitled "Adaptive Private Network with Dynamic Conduit Process"; U.S. patent application Ser. No. 14/972,270 filed on Dec. 17, 2015 and published as U.S. Patent Application No. 2016-0182305 A1 entitled "Methods and Apparatus for Providing Adaptive Private Network Centralized Management System Discovery Processes"; U.S. patent application Ser. No. 14/972,353 filed on Dec. 17, 2015 and published as U.S. Patent Application No. 2016-0182319 A1 entitled "Methods and Apparatus for Providing Adaptive Private Network Centralized Management System Timestamp Correlation Processes"; U.S. patent application Ser. No. 14/972,514 filed on Dec. 17, 2015 and published as U.S. Patent Application No. 2016-0179850 A1 entitled "Methods and Apparatus for Providing Adaptive Private Network Database Schema Migration and Management Processes"; U.S. patent application Ser. No. 14/973,193 filed on Dec. 17, 2015 and published as U.S. Patent Application No. 2016-0182327 A1 entitled "Methods and Apparatus for Providing Adaptive Private Network Centralized Management System Data Visualization Processes"; U.S. patent application Ser. No. 14/973,343 filed on Dec. 17, 2015 and published as U.S. Patent Application No. 2016-0197802 A1 entitled "Methods and Apparatus for Providing Adaptive Private Network Centralized Management System Time Correlated Playback of Network Traffic"; U.S. patent application Ser. No. 15/409,001 filed on Jan. 18, 2017 entitled "Methods and Apparatus for Configuring a Standby WAN Link in an Adaptive Private Network"; U.S. patent application Ser. No. 15/409,006 filed on Jan. 18, 2017 entitled "Methods And Apparatus For Accessing Selectable Application Processing Of Data Packets In An Adaptive Private Network"; and U.S. patent application Ser. No. 15/409,016 filed on Jan. 18, 2017 entitled "Methods And Apparatus For Accessing Dynamic Routing Information From Networks Coupled To A Wide Area Network (WAN) To Determine Optimized End-To-End Routing Paths", all of which have the same assignee as the present application, are related applications, and are hereby incorporated by reference in their entirety.

FIELD OF THE INVENTION

The present invention relates generally to improved bandwidth tracking and adjustment. More specifically, the present invention relates to improved techniques for determining tracking and adjusting bandwidth on routing paths over an end-to-end system connecting different LANs via WAN system in the context of an adaptive private network (APN).

BACKGROUND OF THE INVENTION

Wide area network (WAN) standards include, for example, digital subscriber line (DSL), asymmetric digital subscriber line (ADSL), and multiprotocol label switching (MPLS), to mention a few. WANs are used to connect local area networks (LANs) allowing devices in one location to communicate with devices and their users in other locations. In a WAN having a large number of remote sites, connections between the sites are many times statically configured. The dynamics of the network system may also change over time making repeated static configurations of the network inefficient and costly to implement. Further, static connections involve reservations of network resources. As data flow patterns change in the network, the reserved resources create non-optimal static connections which cause the network to reserve bandwidth that could be better used elsewhere in the network.

For example, a site A is anticipated to have high bandwidth requirements for data transfer with site B and site C is anticipated to also have high bandwidth requirements for data transfer with site B. Since at the time the network is configured there may be little anticipated requirement for communication between site A and site C and since sites A and C can communicate to each other by going through site B, a communication path between sites A and C is not statically configured. With the network system operating over time, the original assumptions on communication paths will likely change. For example, sites A and C may require communication at a much higher bandwidth at this later time than is easily achieved by communicating through the intermediate site B thereby causing congestion on the paths between sites A and B and between sites B and C. A reconfiguration of the network is not usually feasible due to configuration overhead and lost time in operating the network. Also, different types of data packets require different types of compression applications to more optimally reduce packet size and improve network use of available bandwidth.

Further, the dynamics of the network system may further change over time making repeated static configuration of the network inefficient and costly to implement. For example, in a ship to shore wireless communication network, the ships are the remote sites and they are in constant motion moving closer and farther from land where their shore communication end points are. The ships distance from shore impacts bandwidth available to the wireless communication system. In addition to the distance, atmospheric conditions also impact the bandwidth and quality of the communications. To preserve the quality of the network, it is best for the users of the network to reduce the amount of traffic being transmitted when conditions cause a reduction of wireless bandwidth. Continuing to send bandwidth at a high rate will simply cause a large number of packets to be lost. When there are multiple wireless links available, users of the network can use other WAN links to supplement the bandwidth lost from a WAN link experiencing a degradation of service. Just as wireless links can degrade due to ship motion and atmospheric conduits, they can also improve due to these changes. Network users should increase their bandwidth usage when wireless conditions improve. This allows traffic to move off of higher-cost links and makes sure that all of the bandwidth that is available can be put to productive use. These wireless networks are much more dynamic than typical wired networks. In a typical wired network, high loss is a symptom of a problem at the service provider, but in wireless environments such disruption is just the nature of the communications medium. In most wired WAN networks, it is possible to statically configure equipment to make use of the WAN and that configuration only needs to be adjusted if the service purchased from the service provider is changed.

As networks become larger and more complex, administrative techniques for managing the network are increasingly more complex and costly. An increasing number of network configurations are configuring high cost links, such as 3G/4G cellular links, in their network as backup links. These high cost backup links either incur significant charges when used or when a monthly data cap is exceeded so the intent is to carry user traffic only when all other links are down. In other words, these backup links are only links of last resort and very costly to use. Users often have a variety of backup WAN links and each of these links have different costs. Some links have a data cap that is covered by a monthly fee, with data usage above that cap incurring significant charges. Other links may incur a significant cost for each byte transmitted. Customers often have a minimum amount of WAN bandwidth that is needed to support critical applications and it is costly if those applications are not available. The most efficient operation of the network often means bringing online a small amount of bandwidth from high cost WAN links to supplement what is available from lower cost WAN links.

It is not always clear how much bandwidth a WAN link can actually support. Service providers may market a WAN service as "Up to X Mbps", where it is not guaranteed that X Mbps will always be available. To deal with this, users run bandwidth tests that push traffic through the network and measure the capacity. This measurement can be used to configure network equipment that interfaces to the WAN or as a diagnostic aid to support complaints to the service provider if the WAN performance is insufficient. Most of these speed tests use an Internet service to push a large amount of traffic for several seconds. On a production network running business-critical real time applications, this type of network usage can be disruptive. On WAN links that are part of private networks (e.g. MPLS) there may not be connectivity to the Internet service used for the speed test. This speed test can also be time consuming, especially when several WAN links need to be tested. It is desirable to have a testing technique that allows a very small burst of traffic to determine the bandwidth of a WAN link. It is also desirable to run this speed test on private networks.

SUMMARY OF THE INVENTION

Among its several aspects, the present invention recognizes that in wireless networks covered by this invention, it is advantageous to automatically adjust to dynamic changes in communication paths. Among its several aspects, an embodiment of the invention applies a method for automatically activating standby backup paths. An adaptive private network (APN) is configured with one or more regular active wide area network (WAN) links and a first on-demand WAN link. A conduit in the APN is operated with the one or more regular active WAN links in active mode and the first on-demand WAN link in standby mode. The first on-demand WAN link is activated to supplement the conduit bandwidth in response to determining an available bandwidth of the conduit falls below a pre-specified trigger bandwidth threshold and the conduit bandwidth usage exceeds a usage threshold representing a percentage of a bandwidth of the conduit that is being supplied by the active paths.

Another embodiment of the invention applies a method for automatically activating and deactivating standby backup paths. A conduit operates in an adaptive private network (APN) with the one or more regular active wide area network (WAN) links in an active mode and the first on-demand WAN link in a standby mode. The first on-demand WAN link is activated to supplement the conduit bandwidth in response to determining an available bandwidth of the conduit falls below a pre-specified trigger bandwidth threshold and the conduit bandwidth usage exceeds a usage threshold representing a percentage of bandwidth of the conduit that is being supplied by the active paths. The first on-demand WAN link is deactivated to standby mode in response to determining an available bandwidth of the conduit is above the pre-specified trigger bandwidth threshold and the conduit bandwidth usage drops below the usage threshold.

Another embodiment of the invention applies a method for adaptive bandwidth detection. A first on-demand WAN link is brought up after initialization in an accelerated growth state to determine a maximum possible bandwidth for the first on-demand WAN link. Excessive loss is determined to be occurring on the first on-demand WAN link. A previously good bandwidth operation is returned to for the first on-demand WAN link. A non-growth state is transitioned to using the previously good bandwidth operation of the first on-demand WAN link to supplement the conduit bandwidth.

A further embodiment of the invention addresses a method for automated bandwidth testing across an adaptive private network (APN) paths. An automated bandwidth test is configured between a user and an network control node (NCN) of the APN. A sequence of N packets is sent from a first site, each of the packets having a same length L, and comprising a timestamp of when sent on a designated path in the APN across a WAN link to a destination site, wherein each of the N packets are configured as control test packets. The sequence of N packets is received at the destination site and marking each received packet with a receive timestamp. A path bandwidth is determined according to the difference between the Nth packet and the first packet.

A more complete understanding of the present invention, as well as other features and advantages of the invention, will be apparent from the following detailed description, the accompanying drawings, and the claims.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1A:
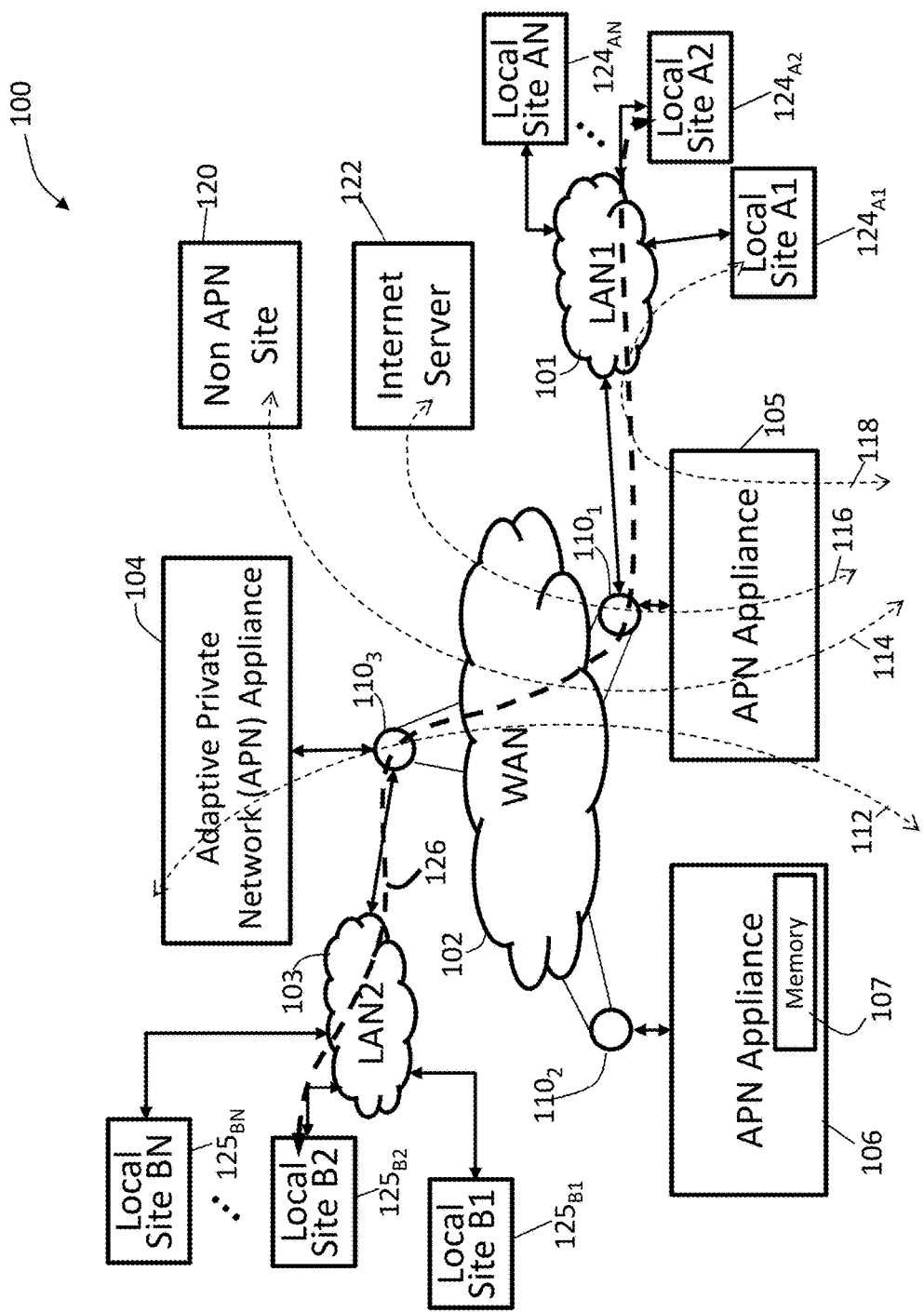
FIG. 1A illustrates an end-to-end network configured with client nodes on local area networks (LANs) coupled to a wide area network (WAN) under control of an adaptive private network (APN) showing service paths in accordance with an embodiment of the present invention.

FIG. 1A illustrates an exemplary adaptive private network (APN) 100 having local sites $124_{A1}$, $124_{A2}$, ... $124_{AN}$, local sites $125_{B1}$, $125_{B2}$, ... $125_{BN}$, on local area networks, LAN1 101 and LAN2 103, respectively, coupled to a wide area network (WAN) 102 under control of the APN showing service paths in accordance with an embodiment of the present invention. The APN 100 includes one or more wide area networks (WANs), such as WAN 102, APN appliances (APNAs) 104-106, WAN routers $110_1$-$110_3$, and network application services as well as APN conduits between APNAs, as described in more detail below. The APN is configured from a single APNA acting as a network control node (NCN) that provides a single point of control for the APN. First, however, a number of terms used herein are defined with the meaning they have when used in the context of the present invention.

An APN path, also referred to as a regular path, is a logical connection established between two WAN links located at different geographic sites across a WAN where one WAN link sends traffic to the other WAN link. Since Paths are unidirectional entities (one sender and one receiver), two WAN links that are connected to each other will have two paths between them. Each WAN link will see one path as being its transmit path and the other as the receive path. A regular path is used to send user traffic under normal circumstances.

An APN conduit is a virtual connection between two APN nodes, also referred to as client sites, and formed by aggregating one or more APN paths and their allocated WAN link resources. A conduit service is a logical combination of one or more paths. A conduit service is typically used for enterprise site-to-site intranet traffic, utilizing the full value of the APN. With a conduit service, depending on configuration, traffic is managed across multiple WAN links to create an end-to-end tunnel. The conduits overlay a virtual network on top of the underlying network.

A conduit maximum transmission unit (MTU) is defined as a minimum link MTU of the one or more APN paths in the conduit between a source site and a destination site.

An APN appliance (APNA) is a device that contains APN client site functionality including software modules which governs its participation in an APN. A high availability (HA) site contains two APNAs, one that is active and one that is in a standby mode of operation and available to become active in place of the other APNA if required.

A WAN link represents a physical access point to the wide area network (WAN), such as a digital subscriber line (DSL) connection or a cable modem. The distinctive characteristic of a WAN link is the bandwidth, or in other words, the amount of data capacity available for transmission and reception. WAN links can be shared among APN conduits, and intranet and Internet network services. In the present embodiments, the APN appliances do not directly attach to WAN links. APN appliances communicate with WAN links through logical connections, such as the WAN routers $110_1$-$110_3$ of FIG. 1A.

If backup WAN links are considered links of last resort, they will not be brought online until all lower cost WAN links are completely down. This could be costly as the lower cost WAN links may not have been providing sufficient bandwidth to service critical applications. There are three types of WAN links, regular active, last resort standby, and on-demand standby. A regular active WAN link is a WAN link configured in an active mode, which is the default mode for the WAN link. The system is always free to use a regular active WAN link for traffic. An on-demand standby WAN link is used to supplement the regular active WAN links if they cannot provide bandwidth above a user specified threshold. An on-demand standby WAN link has a cost constraint that means it should not be used if all of the regular active WAN links are healthy. A last resort standby WAN link is used only when there are no regular active or on-demand standby WAN links available.

On-demand standby and last resort standby WAN links are configured with priority values that control the order that they are put into service. Regardless of priority values, on-demand standby links are always used before last resort standby links. Lower priority on-demand standby links are brought into service before higher priority on-demand standby links. Lower priority last resort standby links are brought into service before higher priority last resort standby links.

A regular active path is a path where both WAN links are regular active WAN links. A last resort standby path is a path where one of the WAN links is a last resort standby WAN link. An on-demand standby path is a path where one WAN Link is an on-demand standby WAN link and the other WAN link is either regular active or on-demand Standby. An on-demand standby path is not used to send user traffic except when all regular active paths in a conduit are dead or disabled or when the backup path is activated to supplement bandwidth for the conduit. DEAD means the path is considered unusable by the system. This is due to extremely high loss or long periods of silence. Disabled means that a user has requested that software not use the disabled path. An on-demand standby path is used to supplement bandwidth in a conduit. A last resort standby path is not used to supplement bandwidth of a conduit. The last resort standby path is activated only when all regular active, on-demand standby, and lower priority value last resort standby paths are either dead or disabled.

A private WAN link provides a physical access point to non-public WAN destinations. Examples of such private WAN links include an asynchronous transfer mode (ATM) link with an ATM virtual circuit, a frame relay link with a frame relay circuit, a multiprotocol label switching (MPLS) tunnel, a virtual private network (VPN) tunnel, or a leased point-to-point line. Connectivity on a network having a private WAN link is made to a private list of destinations on the other end of the network. A public WAN link represents a physical access point to the Internet. It can be assumed that any public WAN link can establish a connection to any other public WAN link.

A local WAN link (LWL) is an APN client site's access point to a WAN. A site A's LWL is coupled to a corresponding remote WAN link for a site B. For a conduit between a site A and a site B, site A's local WAN links are site B's remote WAN links.

An Internet service is used for traffic between an enterprise site and sites on the public Internet. Internet traffic is not encapsulated. During times of congestion, the APN manages bandwidth in the network by rate-limiting Internet traffic relative to traffic on a conduit taking into account the network configuration established by an administrator.

An intranet service is used for any portion of enterprise intranet traffic that has not been defined for transmission across a conduit. As with Internet traffic, the intranet traffic remains unencapsulated, and the APN manages bandwidth in the network by rate-limiting the intranet traffic relative to other service types during times of congestion. Note that under certain conditions, and if configured for intranet fallback on the conduit, traffic that ordinarily travels via a conduit may instead be treated as intranet traffic in order to maintain network reliability. Since conduit traffic is site-to-site, customers generally have a way to deliver this site-to-site traffic without the conduit. This unencapsulated service, called an intranet service, does not receive the benefits of the conduit. If the conduit tunnel cannot be brought up, then routes which use that conduit are ignored and this means that traffic that would have used the conduit are redirected to use an unencapsulated site-to-site transport method.

A routing domain represents a segmentation of a network. Traffic can only flow within one routing domain, not across routing domains. Separate routing domains may be set up based on segmentation of traffic within an enterprise for security reasons, as when a guest network should be fully segmented from an employee network. In another example, separate routing domains may be set up based on segmentation of traffic within an enterprise for manageability reasons, as when a large corporation organizes its network into distinct routing domains. Also, traffic within a very small aperture terminal (VSAT) satellite network may be segmented into separate routing domains to support multiple tenants at a client site. In a further example, traffic may be segmented within a managed service provider network to separately support multiple customer networks.

A static conduit is a conduit configured in a configuration file and created at startup time of an APNA. A static conduit is not removed without changing the configuration file.

A dynamic conduit is a conduit created between APN clients when needed and which can be removed when no longer needed.

In one embodiment, a software application allows flows to be grouped together. A criterion that is used to group flows together may vary depending on the intended use. Some organizations may want to group all flows that interact with a company's web domain, such as a sales domain by use of a software sales application, while other organizations may want to view the software sales application as an Internet web browsing application that also includes access to other domains. For example, email is usually used extensively and is also generally considered very important, so it would be reasonable to view a product such as Outlook™ as an application. In this scenario, the software sales application would include flows from an Outlook client as well as the Outlook web application web page.

A WAN application (WANapp) virtual machine is an optimization device, such as a device that provides one or a plurality of selectable compression algorithms that are applied to communication traffic.

A web cache communication protocol (WCCP) is an exemplary protocol for use as described in more detail below. It is appreciated that an alternative protocol may be utilized having similar or different capabilities depending upon a particular software application of the embodiments described herein.

An APN service is a set of processing steps performed on packets that are transmitted through the APN. As illustrated in FIG. 1A, data traffic that moves through the APN 100 and APN appliance 106 may require different types of services depending on where the sending and receiving stations are located. An APN service instance is a particular configured contextual instance of an APN service held in an APN appliance memory 107 internal to the APN appliance 106, for example. An APN service instance's memory contains, but is not limited to, context specific configuration data, statistical data, and tracking states data. For example, an APN client site may have multiple APN conduits that connect to remote APN client sites. For each APN conduit there exists a separate APN service instance for the APN conduit service type.

An APN conduit service associated with path 112 manages network traffic packets that are transmitted through the APN 100 from the APN appliance 105 through router 110$_1$, through the WAN 102, through another router 110$_3$ to APN appliance (APNA) 104. The APN conduit service for path 112 operates on both APN appliances 104 and 105. The APN conduit service sends and receives data between a first geographic location that has the APNA 105 and a different geographic location that has the APNA 104 utilizing the full benefits provided by the APN conduit service for WAN resource allocation and network adaptation. An APN intranet service associated with path 114 is used to manage the sending and receiving of data between a first geographic location that has the APN appliance 105 and a different geographic location within an enterprise non-APN site 120 that does not have an APN appliance by way of a WAN link that is also utilized by other APN services.

In another embodiment, an APN intranet service, such as the one associated with path 112, may be used to send and receive data to and from a different geographic location that has an APN appliance, but an administrator selectively configures the APN not to use the APN conduit service 112 for a particular type or class of traffic. An APN Internet service associated with path 116 is used to send and receive data between a first geographic location that has the APNA 105 and a different geographic location that is external to an enterprise network by way of a WAN link that is also utilized by other APN services. For example, traffic using the APN Internet service may be associated with a network user accessing a public Internet web server 122. An APN pass through service 118 is used to send and receive data between a first geographic location that has the APNA 105 and a local site 124$_{A1}$ within the same first geographic location. In another embodiment, an APN pass through service may be used to send and receive data between a first geographic location that has the APN appliance 105 and a different geographic location within an enterprise network that does not have an APN appliance and does not traverse the WAN using any WAN links associated with any other APN services.

In a further embodiment, a path 126 has a first local site 124$_{A2}$ connected to LAN1 101 to APNA 105 to WAN router 110$_1$ through the WAN 102 to WAN router 110$_3$ to APNA 104 to LAN2 103 to second local site 125$_{B2}$. LAN1 101 and LAN2 103 are exemplary networks having a plurality of routers and routing paths which are managed and can change to improve network performance.

A conduit comprises multiple paths. A path is formed between 2 WAN links associated with the conduit. Each path in each conduit in the APN is monitored for quality of communication by collecting quality metrics such as packet loss and latency. This monitoring is done by way of control messages and is done on each path whether the path is used to transmit user traffic or not. Accordingly, no path is completely free of traffic unless it is not operational. Since all paths within a conduit are being measured whether there is user traffic through the path or not, the conduit maintains up to date per-path metrics that are used by the APN to select the best network path to transmit user data.

Dynamic conduits address changes in statically configured networks that are not just slow, gradual changes in network usage, but are happening in real time throughout a day across a network which may be global. In real time, dynamic conduits dynamically optimize network performance adapting to changing communication patterns between nodes in the network. Dynamic conduits can also be used to offload traffic from intermediate nodes that may be experiencing congestion.

An adaptive private network (APN) software product according to the present invention runs as a centralized management system within a virtual machine to create APN configurations and to monitor system resources, analyze system resources, and manage a configured APN in operation as addressed further herein. The centralized management system also includes capabilities that provide discovery, timestamp correlation, and database schema migration processes of the present invention. The APN software of the invention, also referred to as APN virtual machine (VM) software, provides analysis and monitoring capabilities that are timely with respect to events to be tracked and monitored while the APN is in operation and provides storage for historical data as taught further herein. The APN system, also referred to as an APN VM system, reduces the time to configure APN appliances and the number of errors that can occur in configuring a system, as well as, to provide detailed performance data correlated across the WAN. The APN system further allows a centralized virtual single point of control by a network control node (NCN) for a physical network in which the NCN provides system wide timing synchronization. The centralized single point of control is not limited to a central location within a network of nodes, may be at any point within the network, and may be coupled at a point that would be considered outside the boundary of a network. Centralized indicates the single point of control aspects of the APN as described further herein.

An onboard configuration facility is a software component designed to plugin to the APN system of the invention and provide an APN configuration compiler, APN configuration editing capabilities, and to provide an ability to create and edit network maps that show nodes of the APN and conduits between the nodes. Each version of the APNA software produces a version of the onboard configuration facility that understands an object model and configuration options for that version of APNA software. The APN system supports installation of multiple concurrent onboard configuration facility plugins so that a single APN software version can manage a variety of APNA software configuration versions. Each version of APNA software, the appliance code, is provided with a default version of the configuration facility, which is also referred to as a configuration plugin. Multiple configuration plugins may be installed. So, the term "onboard" is in reference to the configuration facility or "plugin" when it is running on the APN VM system or on an NCN.

An onboard configuration editor is a component of the onboard configuration facility that represents an APN configuration as a hypertext markup language (HTML) tree and accepts changes to the APN configuration from a user. The onboard configuration editor is closely coupled with a configuration compiler to make changes to the configuration HTML tree. The onboard configuration editor also integrates with a network map facility to display site nodes in a visual map representation of the APN.

An APN configuration file is a text file which describes a configuration of the APN. This configuration file serves as an input to the configuration compiler which generates registries for each APNA in the network.

The configuration compiler is a software program, such as a Java™ program, that can run on an APN system and converts an APN configuration file into either registries for use by APNAs or into an extensible markup language (XML) representation of the object model for use by the onboard configuration facility.

A configuration package is a software data file which contains the APN configuration file along with metadata. Such metadata includes the network maps that are derived from a specific APN configuration.

An onboard configuration facility package comprises the onboard configuration facility in a format which can be installed onto the APN system.

Adaptive private network appliance (APNA) settings are management settings that can be set directly on an APNA. These APNA settings include time parameters, such as for a time zone or time zones and for network time protocol (NTP) including an NTP server address, settings for a Netflow server, user authentication, simple network management protocol (SNMP), event handling, and periodic status reports. These APNA settings are generally not configurable through the APN configuration file. Rather, the APNA settings are managed on a network-wide basis through the APN controls and software of the invention.

A dashboard, in the context of the APN system, is a user configurable display screen which may be customized to display a subset of items from the rest of the APN system. Multiple dashboards may be created with one being chosen as a default home screen for a particular user.

Workspaces are a construct which allow a user to organize a set of objects, allowing the user to save and recreate a state of a management session. Workspaces are used in a similar manner to use of a "project" in a software integrated development environment (IDE) which collects a set of source code files and associated build scripts and resources such as help text and images to create a complex graphical application.

WAN virtualization, as described herein, enables multiple WAN connections to replace individual private WAN connections, such as Internet WAN links, and perform bandwidth aggregation with improved performance while minimizing impact of WAN links with different or changing latency, jitter, and packet loss metrics.

WAN optimization, as described herein, generally utilizes compression, caching, and other techniques to improve data transfers across a network.

A flow is defined by an n-tuple comprising <IP source address, IP destination address, IP protocol number, transmission control protocol (TCP)/user datagram protocol (UDP) source port, if the IP protocol is TCP or UDP, TCP/UDP destination port, if the IP protocol is TCP or UDP>. Depending on the context, other items could be added to the tuple including: a differentiated services code point (DSCP) tag, a routing domain, and a service identifier, and the like. Also, a flow is unidirectional. For example, if nodes A and B are communicating, there is a flow that represents traffic from A to B and a flow representing traffic from B to A.

Figure 1B:
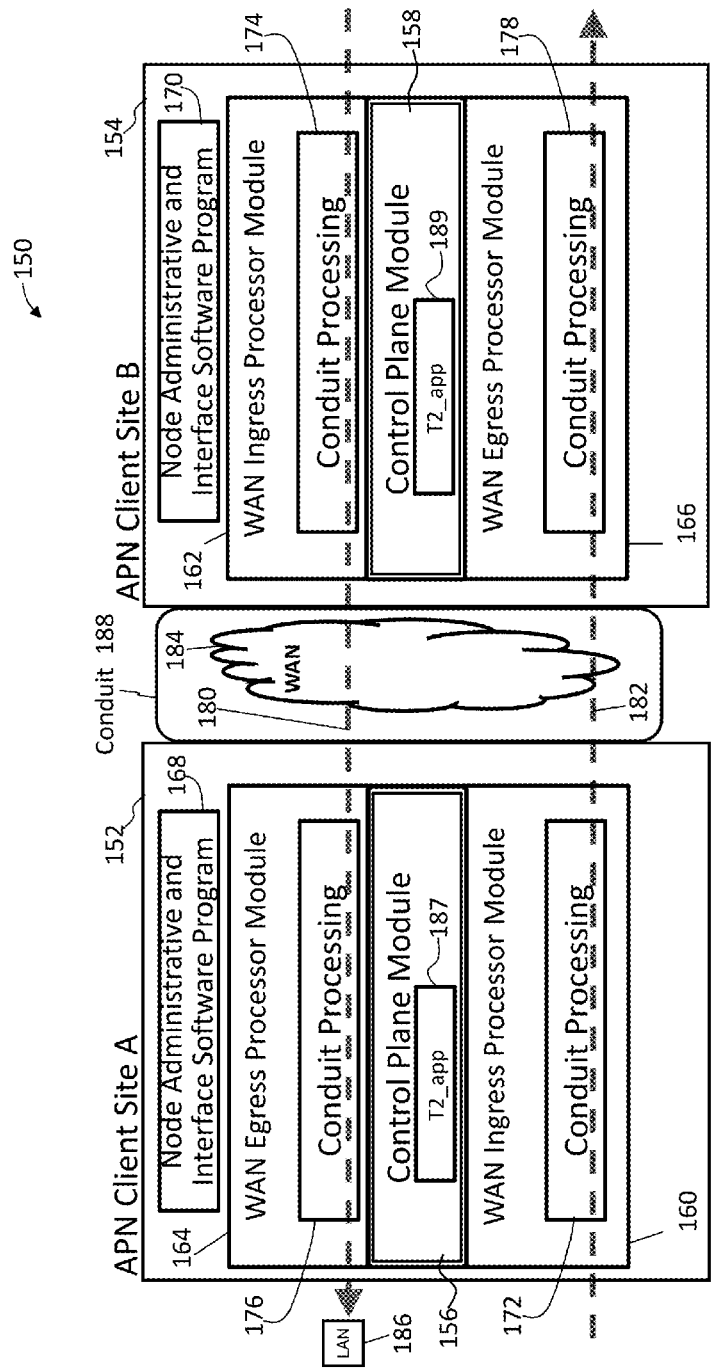
FIG. 1B illustrates an adaptive private network (APN) conduit two-ended service system between a client site A and a client site B in accordance with an embodiment of the present invention.

FIG. 1B illustrates an adaptive private network (APN) conduit two-ended service system 150 between an APN client site A 152 and an APN client site B 154 in accordance with an embodiment of the present invention. Each APN client site is also considered a node in the APN and contains a collection of software modules which govern its participation within the APN. The software modules for the APN client site A 152 and the APN client site B 154 include control plane modules 156 and 158, WAN ingress processor modules 160 and 162, WAN egress processor modules 164 and 166, and node administrative and interface software program modules 168 and 170, respectively. As illustrated in FIG. 1B, the WAN ingress processor modules 160 and 162 include conduit services 172 and 174, and WAN egress processor modules 164 and 166 include duplicate conduit services 176 and 178. Intranet service, Internet service, and pass through service are also provided at each APN client site. Each APN service type, including conduit, intranet, Internet, and pass through service types, implements processes for each type of data traffic that is communicated to and from the WAN respectively.

As illustrated in FIG. 1B, APN conduit traffic, identified by bold dashed arrow paths 180 and 182, flows through the two APN client sites 152 and 154 as the traffic traverses the APN. WAN ingress processing module 162 of APN client site B 154 performs the WAN ingress conduit service processing 174 prior to transmitting the traffic 180 via the WAN 184 to the APN client site A 152. WAN egress processor module 164 of the APN client site A 152 performs the WAN egress conduit service processing 176 prior to transmitting the traffic 180 to the node or nodes located on LAN 186. The binding of one APN client site's WAN ingress conduit processing 174 to the peer APN client site's WAN egress conduit service processing 176 constitutes an APN conduit 188 in which traffic is actively monitored and managed across multiple WAN resources. The t2_apps 187 and 189 are control programs that run on each APNA communicating with other APNAs in the APN while forwarding user data.

The APN is capable of using disparate asymmetric WAN links which frequently vary in behavior with respect to bandwidth, latency, jitter, packet loss and congestion over time. For example, the APN can use an asymmetric DSL WAN link that transmits data at 512 kbps upstream to the WAN and 6 Mbps from the WAN through the public network combined with a private symmetric leased circuit T1 WAN link that transmits data at 1544 kbps upstream and downstream and a cable broadband connection that transmits data at 312 kbps upstream to the WAN and 3 Mbps from the WAN to a peer having adequate aggregation bandwidth of these rates for a single transmission control protocol (TCP) file transfer session at a theoretical transmit rate of 2368 kbps and receive at 10544 kbps or 10.544 Mbps. Practically, under good network behavior, the actual rate would approach 90% of these rates. If the behavior of the connection was to change, for example the paths to the DSL link were to have dramatic levels of loss, the APN would, using its high frequency performance feedback mechanism, adapt the network to avoid or mitigate the issues by using alternative resources or attempting to recover from the loss.

In path selections, conduit paths are evaluated and the best available path is selected. Any paths currently in a path quality good state are eligible to be chosen first. If multiple paths are in a path quality good state, then an estimated end to end time is evaluated and compared for each path, and the path with the lowest end to end time is chosen. If no path is in path quality good state, then a path with the highest bandwidth path quality bad state is chosen. A "one way time" (OWT) refers to the amount of time it takes for a packet to traverse a network from source to receiver. In the context of this invention, the one way time is measured by subtracting a receive time stamp from a WAN egress module 166 from the send time stamp from a WAN ingress module 160, FIG. 1B.

Figure 1C:
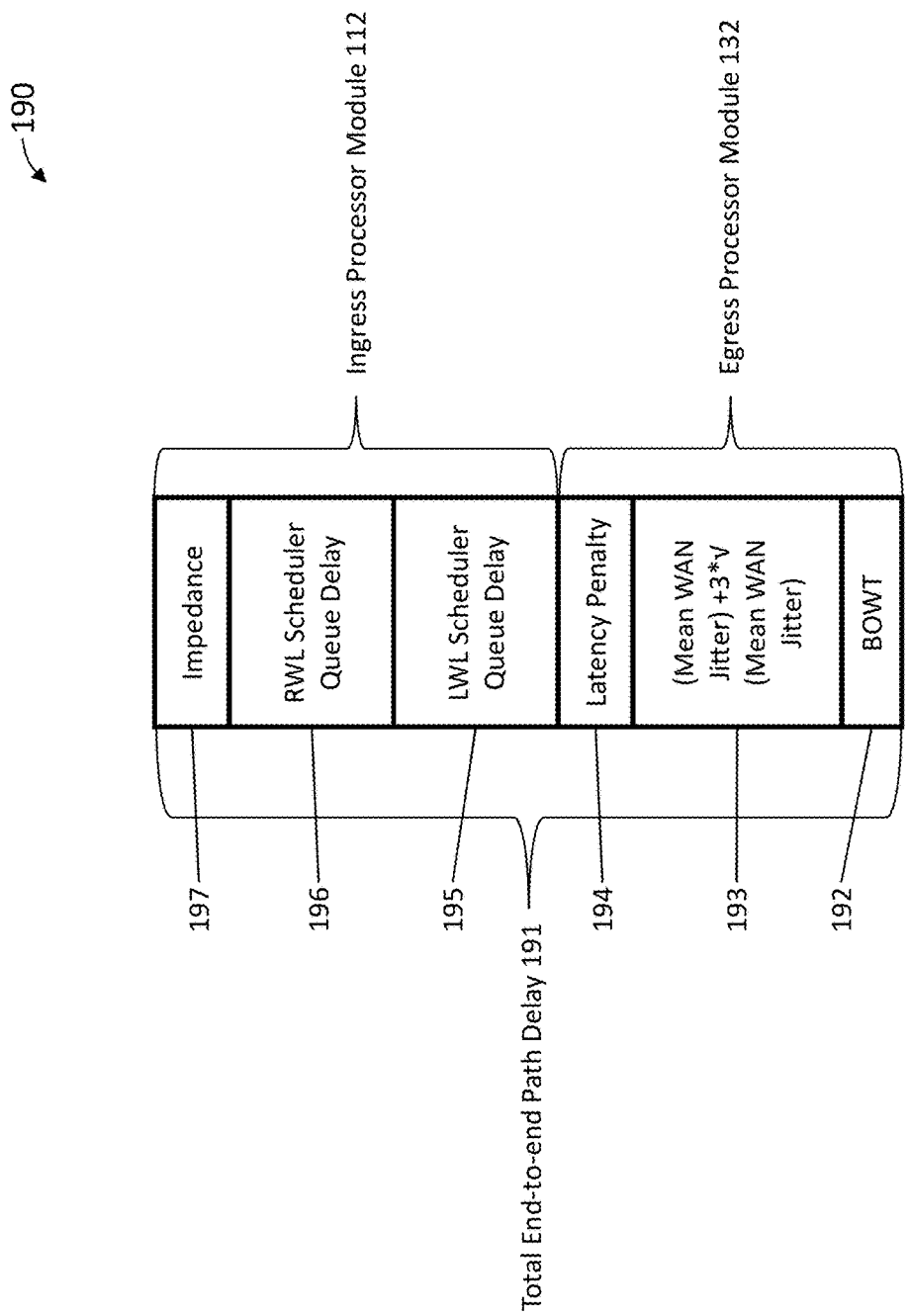
FIG. 1C illustrates exemplary factors used to determine the total end-to-end path delay in accordance with an embodiment of the present invention.

FIG. 1C illustrates exemplary factors 190 used to determine the total end-to-end path delay 191 in accordance with an embodiment of the present invention. The term "best one way time" (BOWT) refers to the lowest measured OWT for a particular packet on a particular path over a period of time. Initially, the evaluation process chooses one best path based on path latency which is calculated using a best one way time (BOWT) 192, mean WAN jitter 193, latency penalty for short term instability 194 and WAN link schedulers' queue delay times 195 and 196, with additional preferential treatment referred to as impedance 197 applied to any prior primary path for the APN traffic flow, if a primary path exists. Thus, an exemplary formula for estimating total end-to-end path delay is the BOWT 192+(mean WAN jitter 193)+3*($\sqrt{}$(mean WAN jitter 193))+latency penalty 194+ local WAN link (LWL) scheduler queue delay 195+remote WAN link (RWL) scheduler queue delay 196+impedance 197. The BOWT 192, mean WAN jitter 193, and latency penalty 194 are provided by a remote APN conduit state resulting from control messaging from the egress processor module 166 of FIG. 1B. The local WAN link scheduler queue delay 195, remote WAN link scheduler queue delay 196 and impedance 197 are provided by the WAN ingress processor module 160 of FIG. 1B. U.S. Pat. No. 8,125,907 filed on Jun. 11, 2009 entitled "Flow-Based Adaptive Private Network with Multiple WAN-Paths" and incorporated by reference herein in its entirety provides further exemplary details of a presently preferred approach to timing and network control in an adaptive private network (APN) at col. 6, line 1-col. 19, line 27, for example.

APN path processing services are responsible for providing a means of communicating user data and control information from one APN node to another APN node across the network. In particular, user data and control information may be transmitted from the WAN ingress processor module 160 of one APN node across the WAN and received at the WAN egress processor module 166, as shown for example in FIG. 1B. Exemplary APN path services which may suitably be provided are listed below:

1. Universal path tagging of all conduit traffic sent across the WAN with high resolution and highly synchronized APN time stamps to enable the highly predictive estimation of transmission latency and statistical variation of latency, subsequently in parallel, a control plane module's path state monitoring service is used to detect optimal paths for traffic to use across the APN.
2. Use of the above optimal path identification to provide, in tandem with a WAN link accounting module, WAN bandwidth reallocation from low performing paths to higher performing paths.
3. Universal path tagging, of all conduit traffic sent across the WAN APN path with path sequence numbers, enables sub second detection of packet loss enabling fast retransmission of user packets with little to no negative effect to the end users.
4. Continual monitoring of and characterization of network behavior at times of lower utilization using heartbeats for fast reaction when network demand does arrive, such as provided by a heartbeat generator.
5. The ability to identify and proactively solicit retransmission when network traffic has been extraordinarily delayed or if the network has ceased to function using a nag method, as provided by a nag process, operating on the path state monitoring module.
6. Universal path tagging of all conduit traffic with network utilization and non-utilization of WAN link resources enabling early detection and avoidance of network congestion prior to the packet loss that is typical of normal TCP like congestion methods.
7. The ability to transmit time sensitive control messages without typical internal scheduling delays for software process staging to rate schedulers, while still maintaining proper long utilizations to the APN network to do retransmission of lost packets without the highly predictive estimation of transmission latency and statistical variation of latency.

The APN client node uses timing data to adjust or calibrate a network time by using a linear algebraic calculation based on the slope-intercept form. In a current implementation, y is the time at an APN control node, also referred to as a network control node (NCN), and x is the client node local time, b is the base offset between the two, and m is the rate of change of y versus x which is the slope. Using these definitions, an equation in slope-intercept form $y=mx+b$ is expressed as network time=slope*client local time+base.

The slope is calculated by taking two samples over a pre-specified period and averaging the samples together. The base offset is calculated by taking the difference of the value between the network control point time and the client time, adjusted for one half round trip time (RTT).

Using queuing theory, Poisson distribution assumptions, and a highly accurate APN wide APN clock sync that allows for accurate one way time measurement, a method is provided that is typically capable of estimating path latency and statistical jitter with an accuracy approaching ~99%. An equation which may be suitably used is best one way time (BOWT)+(Mean WAN Jitter)+3*($\sqrt{}$(mean WAN jitter)). This equation provides a very accurate inference with just a few samples of traffic over a short period.

A path state represents the most current condition of the network path as determined by feedback received by the WAN egress APN node's path state monitoring process. As packets are received, the sequence numbers of the packets are tracked to see if any packets were lost in transit between the WAN ingress APN node and the WAN egress APN node. A method is used to trigger path state transitions that are biased toward more tolerance for loss in the short periods of packets received with substantially less tolerance of loss over longer periods. A unique aspect of this approach is the ability to track the path's packet loss thresholds over numerous durations nearly simultaneously and continually while still maintaining low processor overhead. This aspect is obtained through the universal path tagging of conduit traffic sent across the WAN with high resolution and highly synchronized APN time stamps to enable the highly predictive estimation of transmission latency and statistical variation of latency. In tandem, a control plane module's path state monitoring service is used to detect packet loss and optimal paths for traffic to use across the APN. The result is an ability to detect a difference between occasional incidental short term network loss and long term persistent problems.

In a presently preferred embodiment, the APN node's software modules at a client site are stored and operate in the same physical APN appliance; however, the modules may also exist in separate physical APN appliances in alternative embodiments. The methods described in connection with the embodiments disclosed herein may be embodied directly in one or more software modules executed by a processor and memory complex such as utilized in an adaptive private network (APN) appliance (APNA), a rack mounted processing device, a personal computer, a server, or the like, having one or more central processing unit devices. The processor and memory complex, for example, may be configured to execute instructions that access data and operate on data under control of a software module program stored on a computer readable non-transitory storage medium either directly associated locally with the processor and memory complex, such as may be available through an instruction cache, or accessible through an I/O device. A software module may reside in a computer readable non-transitory storage medium which may include random access memory (RAM), flash memory, dynamic random access memory (DRAM), synchronous dynamic random access memory (SDRAM), read only memory (ROM), programmable read only memory (PROM), erasable programmable read only memory (EPROM), electrically erasable programmable read only memory (EEPROM), hard disk, a removable disk, a CD-ROM, digital video disk (DVD), other types of removable disks, or any other suitable non-transitory storage medium. A non-transitory storage medium may also be coupled to the processor and memory complex such that the hardware processor can read information from, and write information to, the storage medium over an intranet or the Internet.

An adaptive private network node (APN client site) contains software modules supporting participation in an adaptive private network. An APN node may exist in one or more APN appliances at a location. An APN node contains a collection of software modules executed by a processor and memory complex located in the APN node which govern the APN node's participation within an APN such as control plane modules 156 and 158, WAN ingress processor modules 160 and 162, and WAN egress processor modules 164 and 166 in FIG. 1B. The control plane module is responsible for controlling and participating in the control of the APN node in tandem with other APN nodes in the network.

The WAN ingress processor module 160 may suitably be embodied as software and hardware components responsible for processing network traffic for transmission from a local area network (LAN) to a WAN. The WAN egress processor module 164 may suitably be embodied as software operating on hardware components, such as a processor and memory complex that is responsible for processing network traffic for transmission from a WAN to a LAN. WAN ingress and WAN egress processor modules are discussed in further detail below. The APN client site's control plane module 156 may suitably be embodied as software operating on hardware components, such as a processor and memory complex that utilizes the APN client site's WAN ingress processor module 160 and WAN egress processor module 164 as the means for transmitting and receiving APN node to APN node control data across the WAN.

Software packages for an APN are distributed through the WAN using control packets, termed Tapplication protocol (TAP) packets, that are utilized as part of change management software or through administrative interfaces, such as downloading software using interfaces 168 and 170 to the APN client sites. The TAP is a protocol for messages that are sent through the WAN to allow processes outside of t2_app on different appliances to communicate with each other. TAP can be considered to operate as a point-to-point or Ethernet like device which, instead of receiving packets from physical media, receives the packets from a user program and instead of sending packets via the physical media, writes the packets to the user program. The t2_apps 187 and 189 of FIG. 1B are control programs that run on each APNA communicating with other APNAs in the APN while forwarding user data. After a software update, the APN services on the APN client sites 152 and 154 are then restarted thus bringing the APN software node configuration into synchronization.

Figure 2:
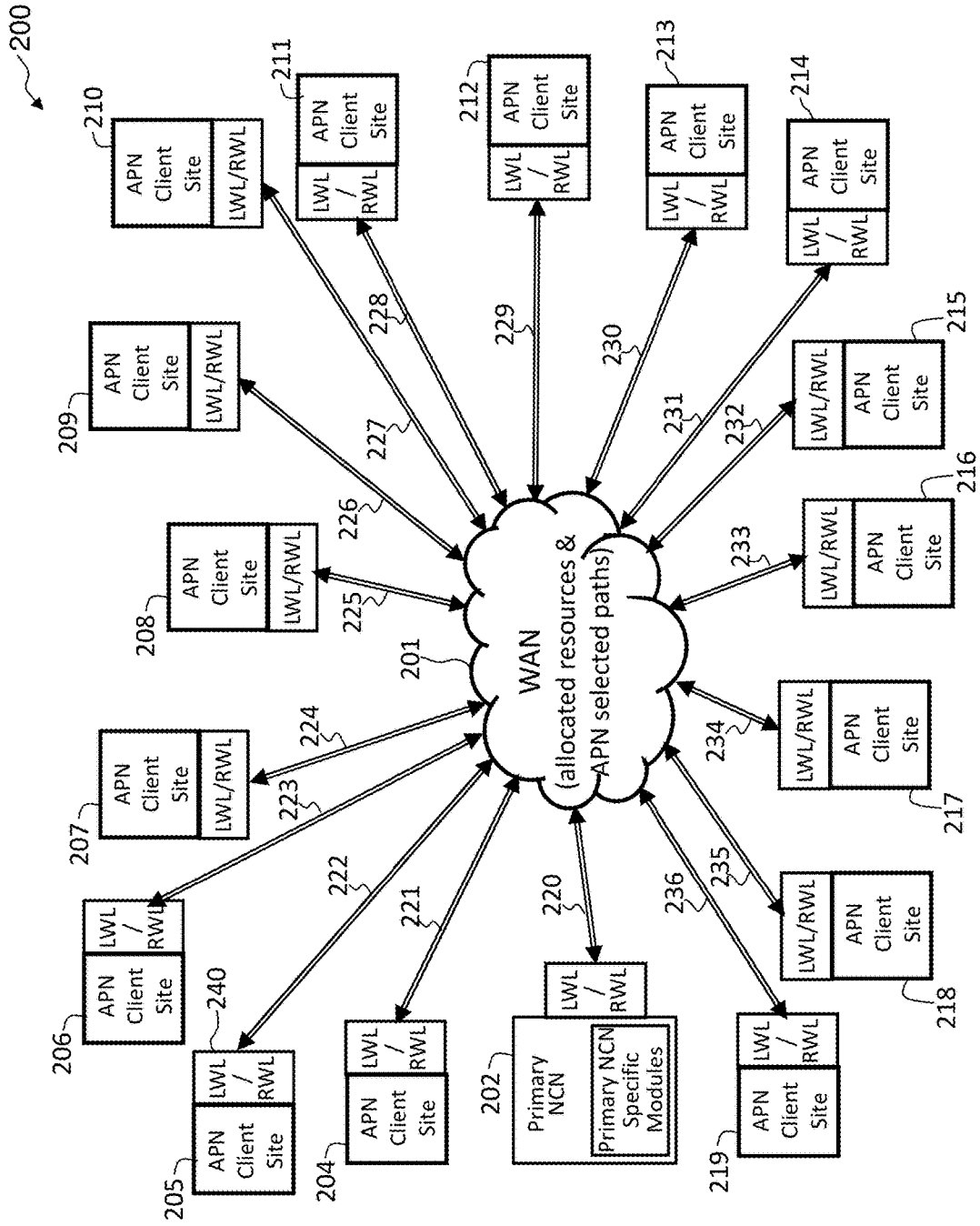
FIG. 2 illustrates an APN having an APN network control node (NCN) and sixteen APN conduits coupled to sixteen APN client sites in accordance with an embodiment of the present invention.

FIG. 2 illustrates an APN 200 having an APN network control node (NCN) 202 coupled to conduit section 220 and sixteen APN conduit sections 221-236 coupled to sixteen APN client sites 204-219, respectively, in accordance with an embodiment of the present invention. As illustrated in FIG. 2, in a presently preferred embodiment, APN 200 is centrally configured. A network administrator configures the entire APN 200 through an APN configuration file that is processed by the NCN 202. The NCN 202 then distributes the configuration settings to all client sites in the APN 200. This method of configuring the APN 200 is intended to provide benefits to the administrator by providing a single point of configuration to the network. It also assures configuration consistency and compatibility for all APN client sites in the network nearly simultaneously, with strict version checking. In a presently preferred embodiment, an intensive configuration audit and validation is done to the configuration prior to that configuration being applied to the network. This audit greatly decreases risks of invalid configurations being placed on the production network. The central configuration also provides for additional configuration bandwidth optimization for the network, by doing a mapping of the APN resources and their initial allocations. Furthermore, the centralized configuration can provide information and warnings to the administrator as to the behavior of the configuration that may not be obvious or intended from the configuration, before loading the configuration onto a production network.

Each of the sites 204-219 and primary NCN site 202 contains an APN appliance to provide APN functionality. The configuration of the APN 200, generally provides for connectivity between a site A, such as site 205, and a site B, such as site 208, where the connectivity from the site A's perspective is site A→LWL→"WAN"→RWL→site B. The connectivity from the site B's perspective is site B→LWL→"WAN"→RWL→site A. The WAN 201 represents allocated WAN link resources and APN selected paths. In FIG. 2, a conduit between a site A and a site B is formed by use of the conduit sections 222 and 225 and is a virtual connection between the corresponding site A and site B. The conduit includes a collection of paths and encompasses a path from a local WAN link (LWL) at site A→"WAN"→RWL at site B.

In one presently preferred embodiment, APN conduits exist between the NCN and, for example, sixteen APN client sites as shown in FIG. 2. It will be recognized that while sixteen APN sites are shown for purposes of illustration, a larger or smaller number of potential APN client sites may be suitably employed. Each APN conduit may have the unique configuration parameters tailored by an administrator for the particular needs of each geographic location associated with a particular APN.

For a definition of APN path states, a description of path processing services is provided below. Any paths currently in a path quality good state are eligible to be chosen first. If multiple paths are in a path quality good state, then an estimated end to end time is evaluated and compared for each path, and the path with the lowest end to end time is chosen. If no path is in a path quality good state, then a path in a path quality bad state with the highest bandwidth is chosen.

The sixteen client sites 204-219 of the exemplary APN 200 are generally located remotely from each other and may include geographically diverse client sites. A site would be defined as remote if the devices are physically in different locations such as different buildings, cities, states, time zones or countries. For example, the primary NCN 202 may be located in a company's headquarters location in a first country with client sites 204-209 and client sites 217-219 also located in the first country. The other client sites 210-216 may be located in a second country.

As used herein, an APN appliance is a device that contains APN node functionality according to software modules, such as the control plane modules 156 and 158, the WAN ingress processor modules 160 and 162, and the WAN egress processor modules 164 and 166, as described in more detail above with reference to FIG. 1B. The sixteen client sites 204-219 are coupled by conduit sections 221-236, respectively, and the conduit sections may be connected together to provide a configurable virtual connection between two connected APN appliances at the client sites. It is noted that while sixteen client sites 204-219 are illustrated, an APN may support as many client sites as are required.

A network control point (NCN) 202 of FIG. 2 is an administration point for the APN 200. In one embodiment, the NCN 202 resides within an APN node. An APN control node refers to an APN node that also performs as the network control point of the APN. In another embodiment, an NCN resides in an appliance that is separate from an APN node and administers and controls the APN nodes within the APN. The NCN provides administrative and control functions to the APN, including but not limited to, distribution of configuration objects to APN client nodes and time synchronization to the APN.

A dynamic conduit is a conduit created between APN clients when needed and can be removed when no longer needed, based on a configured first threshold and a configured second threshold. For example, client site 205 can be configured with two local WAN links, one from a first network provider and one from a second network provider. Multiple conduits may be connected to site 205 which may be configured to use one or both of the local WAN links. In an exemplary scenario where all of the conduits that are connected to site 205 use both local WAN links, then when usage for either local WAN link passes the configured second threshold, creation of a dynamic conduit can be triggered. The first and second thresholds refer to bandwidth levels passing through an intermediate site.

Software code referenced as t2_app provides processes that forward data traffic and control protocols related to conduits. The t2_app code currently comprises five directories: control, forward, manage, platform_api, and common, though not limited to this number of directories. The control directory holds the code related to the control protocols used by t2_app for conduits. The forward directory contains the code that is responsible for moving packets through the system. The manage directory has code that deals with the management plane. The platform_api code is responsible for interfacing with the hardware and the common directory has code which is not specific to any of the other directories.

An APN traffic flow is the administrator designation for network session traffic that is identified to a particular APN flow record. APN traffic flow requirements are administrator-configured requirements that govern an intended behavior of an APN as it pertains to an APN traffic flow. For example, APN traffic flow requirements may comprise a persistent path flow requirement, a duplication flow requirement, and a reliable flow requirement.

An APN flow record is held in the memory of an APN appliance. An APN flow record tracks a defined APN traffic flow, ensuring that the APN traffic flow's prior-configured requirements are followed. The APN flow record contains both the APN traffic flow requirements and the APN traffic flow's state. The requirements of a particular APN flow record are derived from the routes and service rules that the APN traffic flow matches. The state of APN flow record includes, but is not limited to, APN service type, APN service instance, information pertaining to the last APN path selected, current APN flow sequence number, time of last packet received, time of last packet transmitted, counts of number of packets and number of bytes processed, sets of pending packets for sequence reordering, sets of pending packets for fragmentation, and sets of historical records for packets previously processed.

In many networks, a communication base station and nodes in a network are in fixed locations, such as a business network where the base station and nodes are located in buildings though in geographically diverse areas. In other networks, such as ship-to-shore communication networks, only the base station is usually in a fixed location while the ships, which are the nodes of this network, are in constant motion. The ships, cargo, tankers, cruise, or the like, are connected back to shore using only wireless communications.

Figure 3:
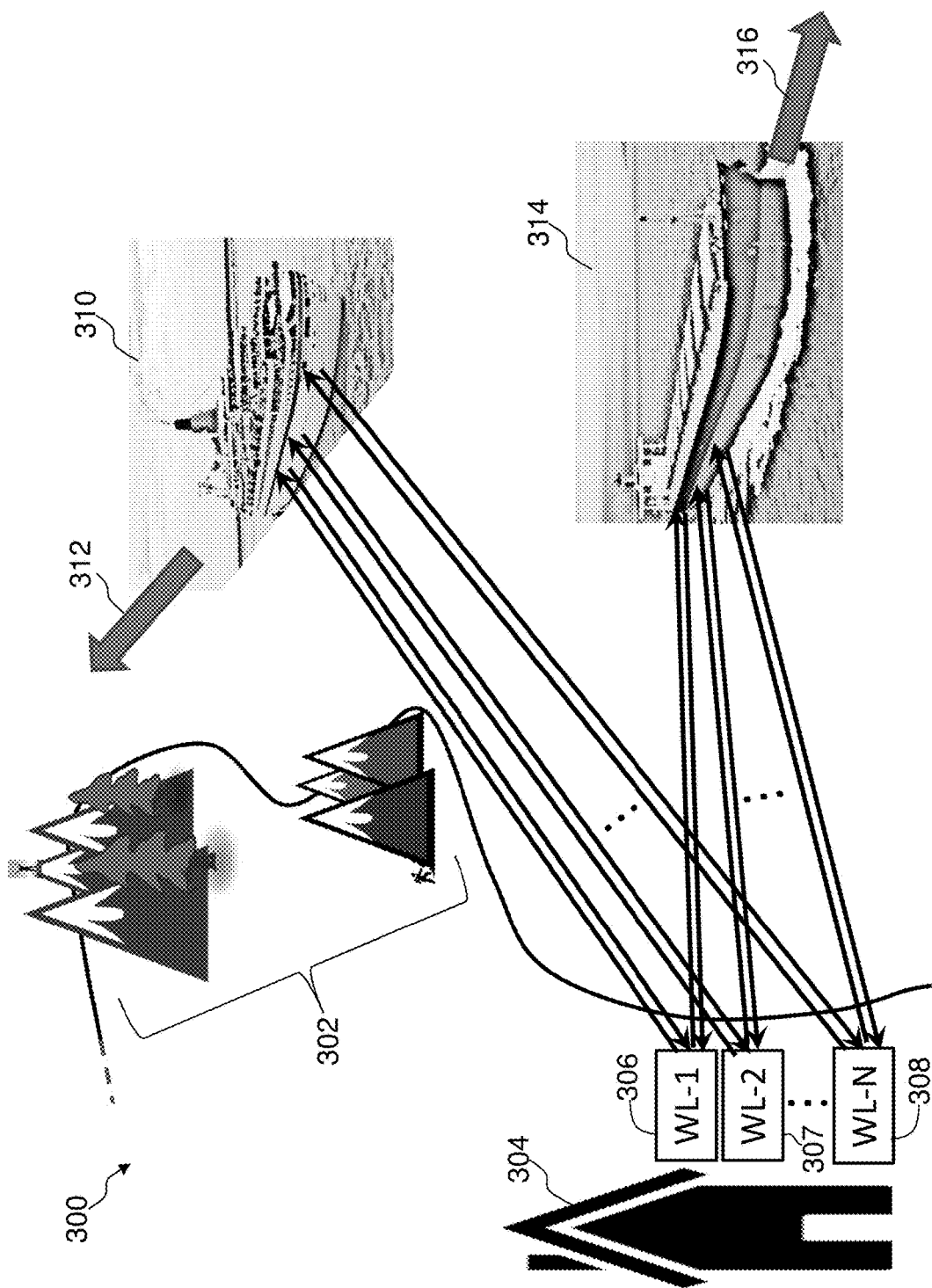
FIG. 3 illustrates a ship-to-shore communication network in which the present invention may be advantageously employed.

FIG. 3 illustrates a ship-to-shore communication network 300 in which the present invention may be advantageously employed as addressed further herein. FIG. 3 includes communication obstacles, such as mountains 302, buildings, and the like, a shore communication station or data center 304 having a plurality of communication links supporting different media types, 306-308, a cruise ship 310 heading in direction 312, and a tanker 314, generally heading in direction 316 out to sea away from shore. As the ships 310 and 314 move, the distance from shore varies which impacts bandwidth available to their communication channels. In addition to distance from shore, atmospheric conditions and communication obstacles can greatly impact communication capabilities. For example, as the cruise ship 310 continues in the direction 312, the mountains 302 begin to affect available bandwidth and may block some if not most of the available communications between the cruise ship 310 and the data center 304.

For example, radios and other transmission devices providing ship-to-shore WAN links change modes affecting their signals to associated antennas to cut through weather as it changes which affects the amount of usable bandwidth that is available. If the weather is sufficiently bad, for example, the WAN links may be interrupted causing a loss of those WAN links. If the WAN links have specified a fixed minimum bandwidth, the links, such as ship-to-shore links, that have a wide variance in bandwidth can cause a WAN link to be removed even though the WAN link may be able to support a bandwidth that is lower than the specified minimum bandwidth.

Returning to the scenario shown in FIG. 3, WAN link-1 (WL-1) 306 at each site, 304, 310, and 314, uses a line of sight (LOS) communications link between two antennas, WL-2 307 uses a long term evolution (LTE) communications link, such as used for high speed data for mobile phones and data terminals, and WL-N 308 uses very small aperture terminal (VSAT) which is a satellite to surface, such as a ship at sea, communication link using a dish antenna smaller than three meters. In use on a ship, the antenna locks on a satellite with reference to the ship's location. The number of WL-1, WL-2, . . . , WL-N may vary at each node in the ship-to-shore communication network 300 of FIG. 3.

In accordance with an embodiment of the invention, a method is described to adjust conduit bandwidth in response to real time usage needs and network conditions to allow a conduit path to stay in a GOOD state longer and be available to carry user traffic, albeit at a lower bandwidth level. A minimum acceptable bandwidth may be specified to each usage on the WAN links. A minimum acceptable bandwidth may be set to a percentage such as between 1% and 90% with a default value of 30%. This percentage represents the minimum bandwidth level a usage can have before bandwidth detection indicates the monitored paths having such usage are going bad. The minimum acceptable bandwidth percentage is calculated as a percentage of a usage's fair share value to determine what the actual minimum acceptable bandwidth for a usage is. The percentage of a usage's fair share value is not a percentage of the usage, but a percentage of the WAN egress rate of the WAN link. A usage is a share of a WAN link that a conduit can use. If the threshold is set to the default of 30% and the WAN egress rate of the WAN link is set to 100 Mbps, then the receive paths on that WAN link will be marked BAD if the automatic bandwidth detection finds that the WAN link cannot support 30 Mbps, for example, or more of traffic.

This bandwidth detection feature is considered a passive bandwidth detection of packets received from the WAN that operates on the egress side of an APNA, such as the WAN egress processor modules 164 and 166. Passive bandwidth detection is also referred to herein as adaptive bandwidth detection. A passive detector detects the rate of receiving packets from the WAN on the egress side without actively causing packets to be sent, such as used by specific bandwidth testing. The user's monitoring of the flow of data does the detection. The method described herein adjusts scheduler rates to raise and lower the allowed rate and observe what is happening, but no packets are required to be actively injected into the network in this embodiment. In an alternative embodiment, small bursts of packets may be sent in conjunction with heartbeat probing, for example, to provide a mostly passive and occasionally active bandwidth detection feature.

Figure 4:
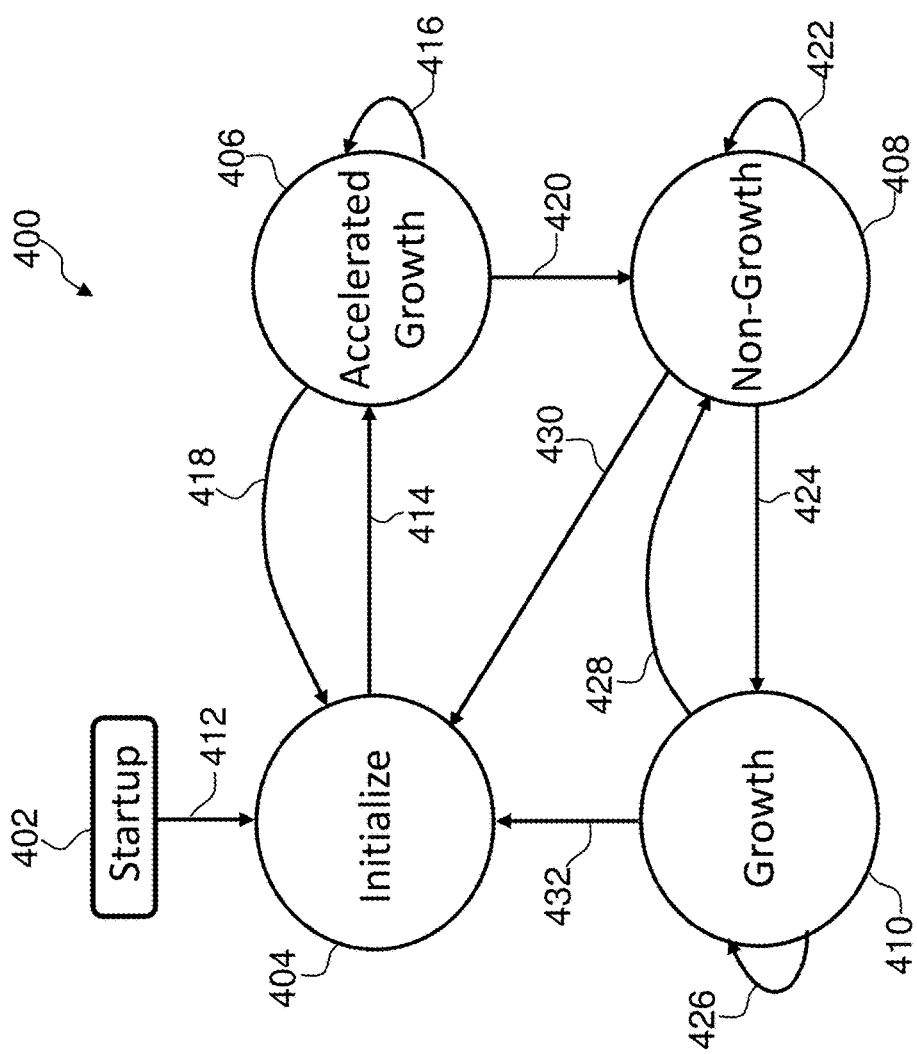
FIG. 4 illustrates a state machine for adaptive bandwidth detection and adjustment in accordance with an embodiment of the present invention.

FIG. 4 illustrates a state machine 400 for adaptive bandwidth detection and adjustment in accordance with an embodiment of the present invention. An adaptive bandwidth state machine 400 is set up on each WAN egress path at each node. For example, both ends of a conduit having a local WAN egress unit and a remote WAN egress unit require an adaptive bandwidth state machine 400. While path state changes are detected on the WAN egress of each path, the state machine adjusts a permitted rate of either the destination WAN link's egress, such as the WAN egress processor module 166, or the source WAN link's ingress, such as the WAN ingress processor module 160, depending on whether the passive detection feature is enabled on the local or remote WAN link, respectively. In the APNAs, the egress WAN link sends control messages to the ingress WAN link side of the path that indicates how much bandwidth the egress WAN link is willing to accept. In this manner, the WAN egress can indirectly open or close the bandwidth pipe as needed. This mechanism is used to discover bandwidth by correlating detected loss with the allowed rate.

Path state changes drive the adaptive bandwidth state machine 400 and the adaptive bandwidth state machine 400 provides feedback into a path state machine to postpone transitioning a path to a BAD state under certain circumstances as described in more detail below. Timer triggers are used to run the adaptive bandwidth state machine 400 before a WAN link accounting is run. For example, every 100 ms, WAN link accounting runs to examine the usage of WAN links over the last 100 ms. Based on the determined rates, the received data rates of various usages, and control messages that have been received, adjustments are made to the amount of bandwidth that different services can get. Basically, this process is where bandwidth arbitration is happening. If ten conduits are trying to use a WAN link, this is where it is decided how much bandwidth each conduit gets to use of the WAN link. Running the adaptive bandwidth state machine 400 informs WAN link accounting about whether it should raise, lower, or keep stable the amount of bandwidth allowed on a WAN link.

Thresholds include a headroom threshold, a loss threshold, and a bad incident threshold. The headroom threshold is used for the case when usage on a link is greater than or equal to ($\geq$) the headroom threshold, such as 50% of current allocated bandwidth, then there is sufficient usage to justify trying to grow the available bandwidth. Otherwise, the system can stop growing bandwidth. The loss threshold is used for the case when a current loss is $\geq$the loss threshold, such as 25% of a specified bad loss setting, then this loss level is approaching an unacceptable loss rate. The bad incident threshold is used for the case when the number of times a path tries to go bad is greater than (>) a pre-specified value, such as ten, for loss and a different pre-specified value, such as two, for silence during the state machine delay interval, then the system determines that path is trying to go bad. A path trying to go bad means that in a normal path state machine, if adaptive bandwidth detection was not enabled, the path would have been declared as BAD. Adaptive bandwidth detection intercepts that indication and prevents that state transition. Instead of declaring the path as BAD, the adaptive bandwidth detection triggers a lowering of bandwidth on the path so that the path state machine can reevaluate the network conditions under the new bandwidth level. If the path was marked BAD, then network traffic would start avoiding the WAN link and the system may not have enough traffic to discover a good bandwidth level.

The adaptive bandwidth state machine 400 includes an initialize state 404, an accelerated growth state 406, a non-growth state 408, and a growth state 410. At block 402, the adaptive bandwidth state machine 400 starts up when the passive bandwidth detection feature is enabled. Such enablement occurs on specified sites when an enable feature indication is received at the specified sites from the network control node (NCN). Once enabled, the adaptive bandwidth state machine 400 makes transition 412 to the initialize state 404. In the initialization state 404, the adaptive bandwidth state machine 400 sets a bandwidth for the associated path's conduit usage to a user configured minimum acceptable bandwidth setting. The adaptive bandwidth state machine 400 waits in the initialize state 404 until an APN, such as APN 200, determines paths associated with the WAN egress processor are each determined to be in a GOOD path state. Once the paths are determined to be in the GOOD path state, the adaptive bandwidth state machine 400 makes transition 414 into the accelerated growth state 406. The adaptive bandwidth state machine 400 is configured to transition out of the initialize state 404 when it is determined that the paths using the WAN link with passive bandwidth detection turned on are good.

Once in the accelerated growth state 406, the adaptive bandwidth state machine 400 utilizes the user configured minimum acceptable bandwidth setting in order to cause the accelerated bandwidth growth. Then for a specified period, such as a maximum of 100 seconds, the bandwidth is increased every 1000 ms, for example, with a goal of attaining the maximum possible bandwidth. Values smaller than 1 second will grow and reach the maximum bandwidth faster, but risks raising the bandwidth before obtaining an accurate view of how the network performs at a current bandwidth. Larger values can provide a more accurate view, but then it takes longer to reach the maximum bandwidth. Checking every second is considered a reasonable tradeoff, but may vary depending on network size, for example.

In state 406, a timer is set to keep track of the bandwidth increments made each transition 416 to grow the usage quickly. For example, after an initial bandwidth coming into the accelerated growth state 406, the first transition may double the bandwidth and if acceptable, on the next transition the bandwidth may be double again. This doubling continues until the maximum possible bandwidth is reached or reaching the end of the 100 second period. In either case, the adaptive bandwidth state machine 400 makes transition 420 to a non-growth state 408. The adaptive bandwidth state machine 400 may make the transition 420 early if the associated path goes BAD, or approaches the loss threshold having an unacceptable loss rate, or grows beyond the headroom threshold. During accelerated bandwidth growth, the accelerated growth state 406 keeps track of previous good bandwidth operations. If the adaptive bandwidth state machine 400 transitions early due to loss or the path going BAD, a hold-off timer is set to a specified period, such as five minutes, the previously good bandwidth is applied, and transition 420 is taken to the non-growth state 408.

In the non-growth state 408, if the path attempts to go BAD, it is prevented from going BAD and transition 422 is taken and the amount of bandwidth available to the usage is reduced. For example, the new reduced bandwidth is set to (a minimum acceptable bandwidth plus ((current usage−minimum acceptable)/2)). Then, the system waits at state 408 for a pre-specified period, such as five seconds, to determine if the path goes back to a GOOD state. If the path is in the GOOD state, the path remains in the non-growth state 408 at the reduced bandwidth. If the path continues to go BAD, the system continues to reduce the bandwidth available to the usage until the minimum acceptable bandwidth is reached. Once the minimum acceptable bandwidth has been reached, the path is allowed to go BAD. While in the non-growth state 408, if the path is GOOD and the hold-off timer associated with transitions 420, 422, or 428 has expired, and if there is room to grow and if the headroom indicates a need to grow, then transition 424 is taken to the growth state 410.

At the growth state 410, the adaptive bandwidth state machine 400 attempts to increase the available bandwidth slowly every transition 426, by increments of a specified period, such as five seconds, up to a specified rate, such as 200 Kbps. This exemplary rate allows for 2.4 Mbps bandwidth increase per minute. If during the growth state 410, the adaptive bandwidth state machine 400 outgrows the headroom threshold or the max allowed bandwidth for the usage is reached, transition 428 is taken back to the non-growth state 408. If during the growth state 410, it is determined that the path is approaching the loss threshold or the path tries to go BAD, the path is prevented from going BAD by stepping back the bandwidth to the previous bandwidth where the path was GOOD. At this point, the adaptive bandwidth state machine 400 takes the transition 428 to the non-growth state 408 and sets a hold-off timer to specified period, such as five minutes. If stepping back the bandwidth is not able to keep the path in a GOOD state, once the minimum bandwidth is reached, the path is allowed to take transition 430 to a BAD state.

The hold-off timers set at transitions 420 and 428 provide a period of stability between growth attempts. At any time, any of the states 406, 408, and 410 can make transitions 418, 430, and 432, respectively, back to the initialize state 404 if a path becomes BAD, DEAD or if the user disables the path/conduit.

In the accelerated growth state 406, the non-growth state 408, and the growth state 410, a one second or five second delay is used before deciding whether to grow or cut bandwidth. Instead of relying on the most recent incident that determines a state change, which may be a change to a path good state, statistics are kept, such as through use of a loss counter, a silence counter, and a good incident counter. For example, a loss count of ten losses and a silence count indicating two silence periods, may be indicative of a bad path. Path loss is detected either via a selective negative acknowledgement (SNAK) packet loss or finding a loss percentage over a specified period. SNAK is a message that the WAN egress side of a path can send to the WAN ingress side when it detects a missing packet on a path. So, if WAN egress receives path sequence numbers 4, 5, 7, the system send a SNAK of sequence number 6 to trigger a retransmission of that packet. This gives the WAN ingress side a good picture of loss without having to wait for a transmission quality report (QR) report.

Path silence is either after three nag packets have been sent or packets have not been received for more than the configured silence sensitivity period. The term "nag" is not an acronym. This programmed algorithm is so named due to the metaphorical "nagging" packets it sends when required. When twenty consecutive packets have been received, the path transitions to a path good state.

Depending on whether passive bandwidth detection is configured on either a local site or a remote site, the site with passive bandwidth detection enabled is used to adjust the bandwidth. If passive bandwidth detection is configured on the local site, then the local WAN link's usage's egress use rate is adjusted. If passive bandwidth detection is configured on the remote site, then the remote WAN link's usage's ingress use rate is adjusted. If both local and remote sites have passive bandwidth detection configured, only the local WAN link's egress use rate is adjusted. Adaptive bandwidth detection is set on a WAN link in the configuration, so it is always set locally to one site. Any remote site that has a path to that WAN link also sees that the far end of those paths has adaptive bandwidth detection enabled and they enable it on their local WAN link only for the conduit to the remote site. This approach allows the site with adaptive bandwidth detection enabled to control the bandwidth that it sends and receives. For example, the site can discover both the upload and download speeds independently. If both ends of a path have adaptive bandwidth detection enabled, then there is no need for a site to enable adaptive bandwidth detection for a particular conduit only.

WAN link usage calculations are accomplished in three steps. At step one, every 100 ms, at the WAN egress side bandwidth allocation is calculated for each local WAN link, based on current usage on the WAN link from each service, the congestion, and in demand. The allocation for each usage ranges from minimum possible bandwidth to maximum possible bandwidth. Bandwidth is calculated regardless of whether the WAN link is in congestion or in demand. "In congestion" and "in demand" are inputs into the bandwidth calculation along with the measured usage over the last 100 ms. "In congestion" means that the system is detecting large changes in the rate the latency is changing and this is indicative of a bottleneck in the network. When this condition is determined, the system reduces the bandwidth usage temporarily to alleviate the situation, if the problem is on the site's local WAN link. "In demand" is an indication that the far end of the conduit is backing up and would like more bandwidth. This backing up is because data is coming from the LAN side at a rate higher than what the WAN egress link is permitting to be sent. "In demand" is a signal that the WAN ingress side can make use of more bandwidth if the WAN egress side makes it available.

Minimum possible bandwidth=MAX(number of path*50 kbps user configured minimum reserved bandwidth). Maximum possible bandwidth=MIN(sum of all related remote WAN links WAN ingress allowed use rate, local WAN link egress allowed use rate, local WAN link maximum allowed use rate if configured). The maximum possible bandwidth can be adjusted down if the WAN link is in congestion.

Step one has calculated a max rate that can be assigned to each usage. At step two, with the usage calculated in step one, for each conduit, allocate bandwidth to each path. Start allocating bandwidth as much as possible to the good path, if there is not enough good path, additional bandwidth is given to the biggest bad path. When allocating bandwidth, the allocation process ensures the total bandwidth for each local WAN link does not exceed the allocation calculated in step one. Also, for a related remote WAN link, the total bandwidth should not exceed a configured WAN ingress allowed use rate on the remote site. In step two, the allocation algorithm makes sure that when it assigns bandwidth to a usage, it does not assign more than the max rate. Any excess bandwidth that would exceed that cap, goes back into a free pool that gets split among usages that have not yet exceeded their data cap. This allocation happens in multiple rounds until there is no free bandwidth left or until every usage is at its cap. This algorithm is not operating only on a single conduit usage, it is deciding how to split bandwidth across all conduit usages on a WAN link. The bandwidth allocation for each local WAN link and remote WAN link for the conduit is sent to the remote site of the conduit in a transmission quality report (QR).

At step three, the result of the calculations in step two get propagated to the WAN ingress side through QR reports which are sent using the APN shared memory infrastructure, as described in more detail in U.S. patent application Ser. No. 13/208,825 filed on Aug. 12, 2011 entitled "Adaptive Private Network Asynchronous Distributed Shared Memory Services" which issued as U.S. Pat. No. 8,452,846 which is incorporated herein by reference in its entirety. The results of the step two calculations tell the WAN ingress side what the WAN egress side allowed rates are. The WAN ingress site attempts to allocate bandwidth on its local WAN links using a balance function. The balance function is used by the WAN ingress side to decide how much bandwidth to allocate for transmission to usages on the local WAN link. The balance function operates within the WAN egress constraints that it received in the QR. For each local WAN link, the WAN ingress site needs to balance out the bandwidth between different services that are using that local WAN link. The actual allocated bandwidth ranges between the minimum possible bandwidth and the maximum possible bandwidth.

Minimum possible bandwidth=MAX(number of path*50 kbps user configured minimum reserved bandwidth). Maximum possible bandwidth=MIN(WAN link ingress maximum allowed bandwidth, sum of all related local WAN link's rate in QR for the conduit).

The three steps from the previous discussion can be used to adjust bandwidth on a WAN link usage dynamically, as determined by the adaptive bandwidth state machine 400 shown in FIG. 4.

Figure 5A:
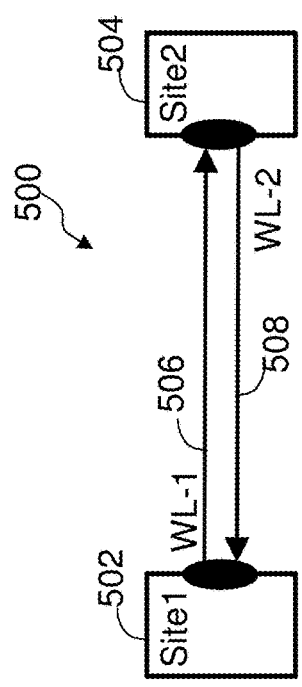
FIG. 5A illustrates a network setup in accordance with an embodiment of the present invention.

FIG. 5A illustrates a network 500 setup in accordance with an embodiment of the present invention. The network 500 setup is used to describe steps necessary to dynamically adjust bandwidth depending on which sites are configured for passive bandwidth detection, and which path detects loss. In a first scenario and a second scenario, it is assumed that the WL-1 at site1 is the WAN link configured with passive bandwidth detection enabled.

For the network setup scenarios one and two, assume WL-1 at Site 1 is the WAN link with passive bandwidth detection configured and enabled. In scenario one, at Site 2, if path WL-1 to WL-2 has loss and the passive bandwidth detection state machine decides the usage for conduit Site1 to Site2 on WL-1 needs to be adjusted to bandwidth1 (B1), then the local (Site2) site's maximum egress utilization WAN is adjusted to B1. This change is communicated to Site1 through a QR message and Site1 adjusts the local (Site1) WAN ingress maximum utilization rate to B1. In step one, as described above, there is no change to WL-2 WAN egress maximum possible bandwidth. In step two, when trying to allocate bandwidth to each path, a bandwidth sum of all paths is calculated using a minimum of site 1's WAN ingress maximum and remote WAN egress maximum utilization rate. WAN egress bandwidth for each usage is calculated by fairly dividing the WAN egress maximum utilization rate among the usages on the WAN link without letting the bandwidth to any usage exceed its calculated maximum rate set in step one. In step three, at site 1, the B1 value which is in the QR limits the WAN ingress allowed use rate. In scenario 1, if passive bandwidth detection is configured on any of the local WAN links in the conduit, don't use the sum of all related local WAN link's rate in QR for the conduit as the maximum possible utilization rate, use B1 instead.

In scenario two, at site1, if path WL-2 to WL-1 has loss, and the bandwidth detection state machine makes a determination that the usage for conduit site2 to site1 on WL-1 needs to be adjusted to bandwidth2 (B2), then the local site's local WAN link egress allowed utilization rate is adjusted to B2. In step one, since WL-1 has passive bandwidth detection set on the local WAN link, the passive bandwidth detection state machine already adjusted the local WAN link egress allowed utilization rate. The allocated usage for the service on WL-1 is used in step two. Nothing needs to be adjusted for steps two and three. At site2, site2 uses the WL-1 egress allowed utilization rate from the QR.

For scenario three, assume both WL-1 and WL-2 have passive bandwidth detection configured, and enabled. Scenario three is treated the same as scenario two.

Figure 5B:
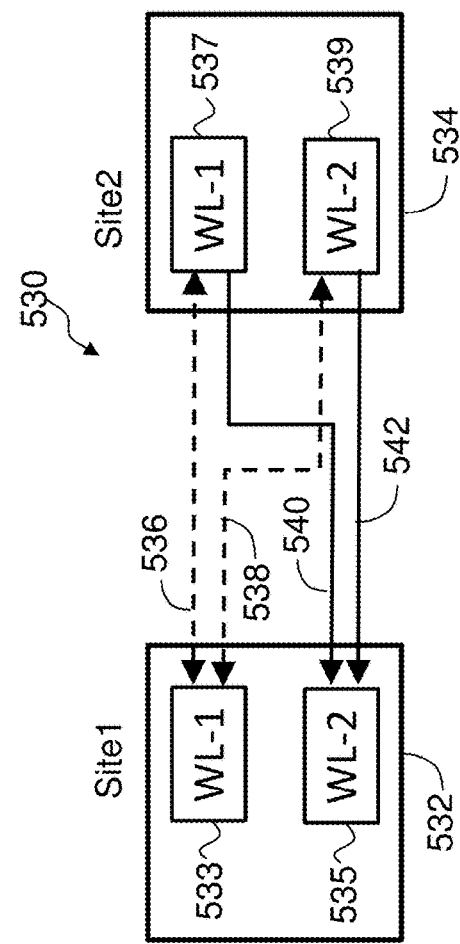
FIG. 5B illustrates a meshed path network setup in accordance with an embodiment of the present invention.

Meshed path considerations for terrestrial applications typically have meshed paths to provide the most reliability possible. FIG. 5B illustrates a meshed path network 530 setup in accordance with an embodiment of the present invention. The meshed path network 500 includes a site1 532, having a WAN link-1 (WL-1) 533 and a WL-2 535, a site2 534, having a WL-1 537 and a WL-2 539, with paths 536 and 538 shown in dashed lines each representing two unidirectional paths, a third path 540, and a fourth path 542. For purposes of clarity, the third path 540 and fourth path 542 are shown as unidirectional paths. In FIG. 5B, assume Site1 WL-2 535 has passive bandwidth detection enabled to make the most of an unstable digital subscriber line (DSL) link.

In FIG. 5B, the communication usage for a conduit between Site1 and Site2 on WL-2 535 at Site1 532 is made up of the third path 540 and the fourth path 542. This means that an adaptive bandwidth state machine, such as the adaptive bandwidth state machine 400 shown in FIG. 4, for monitoring and adjusting the bandwidth has two paths feeding into it at Site1-WL-2 535. In one embodiment, multi-path bandwidth monitoring and adjustment are handled by monitoring the multiple paths in a worst case state to drive the adaptive bandwidth state machine 400. If it is determined that one path has loss greater than a loss threshold or goes bad, then that determination drives decisions to stop growing or cut the bandwidth of that one path. Similarly, all paths should be in a GOOD state in order for the usage to go back into a grow state 410.

In FIG. 5B, a heuristic may be used to discover if the loss had to do with WL-2 or was from deeper in the network. This heuristic would compare the path loss and network usage across paths 540 and 542. If the loss were due to problems with WL-2, then loss should occur on both WAN egress paths. The heuristic is similar to detecting whether congestion is on a local WAN link or from somewhere else in the network. The heuristic also takes into account that if there are a wide range of data rates being used on different paths, a correlation of the characteristics of the paths including loss and network usage is made to determine the extent of any adjustment if required. If loss is not coming from WL-2, then there is no reason to adjust WL-2's rate. If the loss is coming from WL-2, then WL-2's rate is adjusted.

Standby WAN links, as described in U.S. Provisional Application No. 62/280,356 titled "Methods and Apparatus for Configuring a Standby WAN Link in an Adaptive Private Network" which was filed on Jan. 19, 2016 and which is incorporated by reference herein in its entirety, are expanded in capability and configurability and referred to as enhanced standby WAN links herein. An enhanced standby (ES) WAN link is a WAN link that is configured to operate in an on-demand standby mode or a last-resort standby mode. When an ES WAN link is configured in the on-demand mode, the backup paths using this ES WAN link may be activated to supplement bandwidth for the conduit when the available bandwidth for the conduit falls below a configured threshold. The on-demand configured ES WAN links are used before a last-resort configured ES WAN link. When the ES WAN link is configured to operate in the last-resort standby mode, the backup paths using this WAN link are only used in last-resort situations when all regular WAN links and on-demand ES WAN links are either dead or disabled. The last-resort mode of operation of the ES WAN link is not used to supplement bandwidth for the conduit. The ES WAN links support multiple ES WAN links with multiple priorities per site. The ES WAN links also support configurable probing, such as by the use of heartbeat intervals on the ES WAN links, via a configuration editor and allow probing to be completely turned off. A heartbeat interval is the time interval at which heartbeat messages are sent when there is no control or user traffic on a path. An ES WAN link configured in on-demand mode is activated to supplement bandwidth when the passive bandwidth detection and adjustment process determines more bandwidth than non-standby WAN links can supply at the time is needed.

WAN link enhancement can be useful for terrestrial networks where WAN link bandwidth does not vary greatly. For instance, at a data center, it may be desired that an ES WAN link be activated when there is a surge of traffic, so bandwidth is added to the conduit temporarily to maintain adequate service. Under this circumstance, additional bandwidth is needed to meet higher service demand.

In one embodiment, a user can configure a selected maximum number of ES WAN links per site, such as eight ES WAN links. Each of the ES WAN links is configured to operate in an on-demand mode or in a last-resort mode of operation. The APN requires at least one regular WAN link per site that is not configured as a standby WAN link. A priority is associated with each ES WAN link. For example, the priority of a regular WAN link is zero and zero is considered the highest priority and is not configurable. The multiple ES WAN links may have the same priority. Each backup path in a conduit has a path priority that is derived from the priority and stand by operating mode of the two associated WAN links. Backup paths, within the on-demand path type and within the last-resort path type, having the lowest priority are used first and the backup paths with the highest priority among the backup paths are used last. In one embodiment, the paths within a conduit fall into the following categories of decreasing priority order following the "0" priority value as shown in Table 1, for example. It is appreciated that other numbering schemes may be used to represent the priority order from highest to lowest. For example, in Table 1 below, the priority values after zero may be considered negative values.

TABLE 1

| Decreasing Priority | Category | Path Type |
| --- | --- | --- |
| 0 | Regular paths using two regular WAN links (R-R) | regular |
| 1 | Paths using one regular (R) WAN link and one on-demand (O) ES WAN link (R-O) | on-demand |
| 2 | Paths using two on-demand ES WAN links (O-O) | on-demand |
| 3 | Paths using one regular (R) WAN link and one last-resort (L) ES WAN link (R-L) | last-resort |
| 4 | Paths using one on-demand ES WAN link and one last-resort ES WAN link (O-L) | last-resort |
| 6 | Paths using two last-resort ES WAN links (L-L) | last-resort |

A user can configure a heartbeat interval for an ES WAN link in the range of zero to ten seconds, for example, with a default setting, such as one second. When an ES WAN link has a configured heartbeat interval of zero, the heartbeat is disabled for both send and receive paths of the ES WAN link when the paths are not active. The send and receive paths with the heartbeat disabled is considered a no-probe paths while in standby mode. When such no-probe paths become active, the regular path heartbeat interval applies. While the heartbeat is disabled, the external visible state of such paths are always GOOD.

When at least one on-demand enhanced standby (ES) WAN link is configured in a conduit, a trigger bandwidth threshold is set up for the conduit. The trigger bandwidth threshold is used to determine whether to activate backup paths for conduit bandwidth supplement purposes. The available bandwidth is the sum of the bandwidth that can be provided to the conduit over all of the active paths. When the available bandwidth of the conduit falls below the trigger bandwidth threshold, as shown in decision block 718 of FIG. 7, meaning the system is getting close to using all of the available bandwidth, and the conduit bandwidth usage exceeds a usage threshold, shown as > % threshold of $BW_C$ in decision block 720, such as representing exceeding 80%, for example, of the bandwidth of the conduit being supplied by the active paths, then an on-demand ES WAN link is activated to supplement bandwidth.

When the conduit available bandwidth is above the trigger bandwidth threshold, meaning there is plenty of bandwidth available, and the conduit bandwidth usage drops below the % threshold of $BW_C$ as specified in decision block 720, such as below the 80% of $BW_C$ or in an alternative embodiment below 50% of the bandwidth being supplied by the active paths, for example, then the on-demand ES WAN link is deactivated. The use of two thresholds, the trigger bandwidth threshold and the usage threshold in conjunction with the hold time, injects a form of hysteresis between the activation and the deactivation of the on-demand ES WAN link. The duration of the hysteresis affects how quickly a change can be made to the WAN links after a previous change has occurred as restricted by the hold time. The trigger threshold acts as a gate keeper that must be passed to activate or deactivate the on-demand ES WAN link. The conduit bandwidth usage is how much traffic is actually flowing through the conduit. It is a rate that is measured. The hold time restricts how frequently activations and deactivations occur. The conduit available bandwidth generally should only change as the active state of paths changes. If the actual measured usage is not close to using what is available, then there is no reason to supplement the bandwidth since the user already has more than is needed. Only when the usage starts coming close to using all of the available bandwidth does the system bring supplemental bandwidth online.

The on-demand ES WAN links are activated in an increasing order of the configured priority values and are deactivated in the reverse order. The on-demand ES WAN links support conduit services only and do not support Internet or intranet services. Intranet services may be configured on last-resort ES WAN links. Internet service may be configured on last-resort ES WAN links, but only load balance mode is supported. Priority 1 last-resort ES WAN links are used when all regular WAN links for that Internet service are dead or disabled. Priority 2 last-resort ES WAN links are used when all regular WAN links and all priority 1 last resort ES WAN links are dead or disabled. Priority 3 last-resort ES WAN links are used when all other WAN links are dead or disabled. To favor regular paths over active on-demand backup paths during forwarding path selection, a time cost can be added to the active backup paths. The path selection algorithm depends on measuring the latency of the path. This latency includes network latency as well as latency of getting packets through the APNA's local schedulers. Penalties are added onto the actual latency to bias in favor of certain paths. This penalization is done many times when dealing with loss, for example. Paths with loss get a penalty that scales linearly with the amount of loss to bias the selections towards paths with less or no loss. The use of measured latency works the same way in that on-demand backup paths get a penalty added to their latency to steer traffic away from them. As the regular active paths fill up, their latencies will increase enough that eventually the on-demand backup links will be a better choice for selection.

The ES WAN links run in step two at WAN egress in the WAN link usage calculation three step process described above. In step two, the adaptive bandwidth state machine 400 has adjusted either the local WAN egress or remote WAN ingress use rate before an ES WAN link decides if a path's bandwidth needs to be supplemented by activating the standby WAN link or not. All paths in the same path group are activated when the ES WAN link is activated. If that is not enough bandwidth, then the next priority path group is activated. The adaptive bandwidth state machine 400 communicates with each ES WAN link to not supplement bandwidth if t2_app start time is less than 130 seconds or a high availability (HA) failover has been less than 130 seconds. This is the amount of time that the forwarding service has been active, either from an initial start or after taking over as active in an HA pair. This time period ensures that supplementing bandwidth is not started until there is a stable picture of the network. If the forwarding service restarted too soon, the system may be in a position where paths are down simply because not all the conduits have come up yet, and not because the supplemental bandwidth is necessary.

A user interface (UI) may be set up to support configurability. By default, the link mode of a WAN link is regular active and the priority field and heartbeat interval field on the UI are grayed out or hidden, since by default the priority of the regular WAN link is zero and not configurable. When the link mode of an ES WAN link is set to on-demand standby or last-resort standby, both the priority and the heartbeat interval fields become visible and can be optionally configured. By default, the priority of a standby link is set to one and the heartbeat interval is one second, for example. The on-demand is always higher priority than last-resort by definition, regardless of the priority values set when the system is in operation.

When an on-demand ES WAN link is configured, the user must configure a trigger bandwidth threshold that is a percentage of the conduit fair share rate. The conduit fair share rate is how much bandwidth the conduit can expect to get if all conduits were to try to use all of the available bandwidth. When the available bandwidth provided by the regular WAN links in the conduit falls below the configured trigger bandwidth threshold, on-demand ES WAN links are activated to add bandwidth to the conduit. The trigger bandwidth threshold can be set for both a static conduit and a dynamic conduit.

Figure 6:
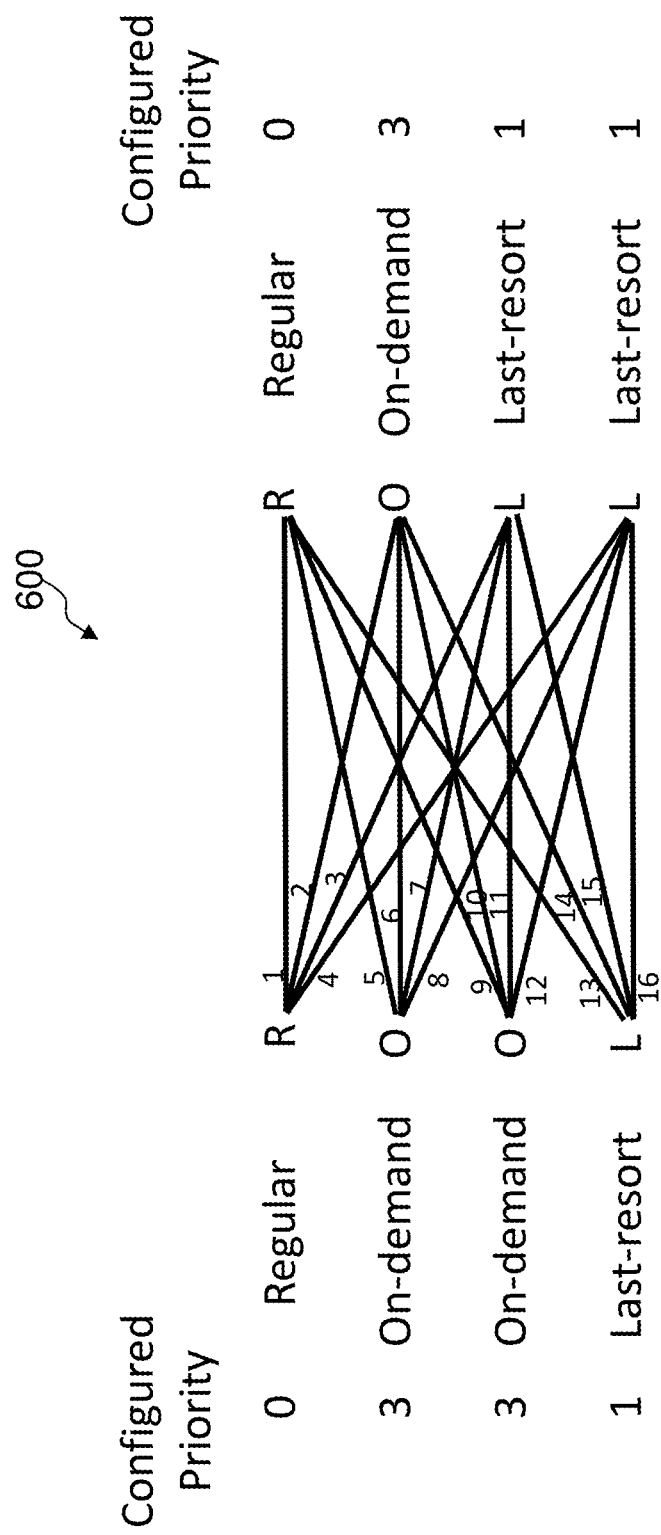
FIG. 6 illustrates an exemplary network showing a conduit with ES WAN links of different configured modes in accordance with an embodiment of the present invention.

FIG. 6 illustrates an exemplary network showing a conduit 600 with ES WAN links of different configured modes in accordance with an embodiment of the present invention. The priority value of all regular paths is zero, considered the highest priority, for example. The priority value of an on-demand backup path must be lower than that of a last-resort backup path. A derived priority is calculated for each path by adding an offset to the WAN link priority based on the type of WAN link and then summing the WAN links on each end of the path. Paths in a conduit fall into the categories shown in decreasing order of priority value following the "0" priority value as shown above in the exemplary Table 1. To ensure the derived priority value of a backup path strictly adheres to the order shown in Table 2 below, for example, during calculation of derived priority, a specified offset is added to the configured priority value of each on-demand ES WAN link and a specified offset is added to the configured priority value of each last-resort ES WAN link. Paths of the same derived priority value are grouped together and assigned to the same path group. Consecutive integers are assigned to backup path groups starting at 1 and path group 0 is a regular path. Depending on the implementation, an offset x can be added to the highest path cost in the on-demand path groups. The goal is to ensure that last-resort backup paths always have a higher cost than on-demand backup paths. It is appreciated that other numbering schemes may be used to represent the priority order from highest to lowest. For example, in Table 2 below, the priority values after zero may be considered negative values.

TABLE 2

| Derived Path Priority | Paths | Path Type | Path Group |
|---|---|---|---|
| 0 | 1 | regular (R-R) | 0 |
| 3 | 2, 5, 9 | on-demand (R-O) | 1 |
| 6 | 6, 10 | on-demand (O-O) | 2 |
| 11 | 3, 4, 13 | last-resort (R-L) | 3 |
| 14 | 7, 8, 11, 12, 14 | last-resort (O-L) | 4 |
| 22 | 15.16 | last-resort (L-L) | 5 |

Figure 7:
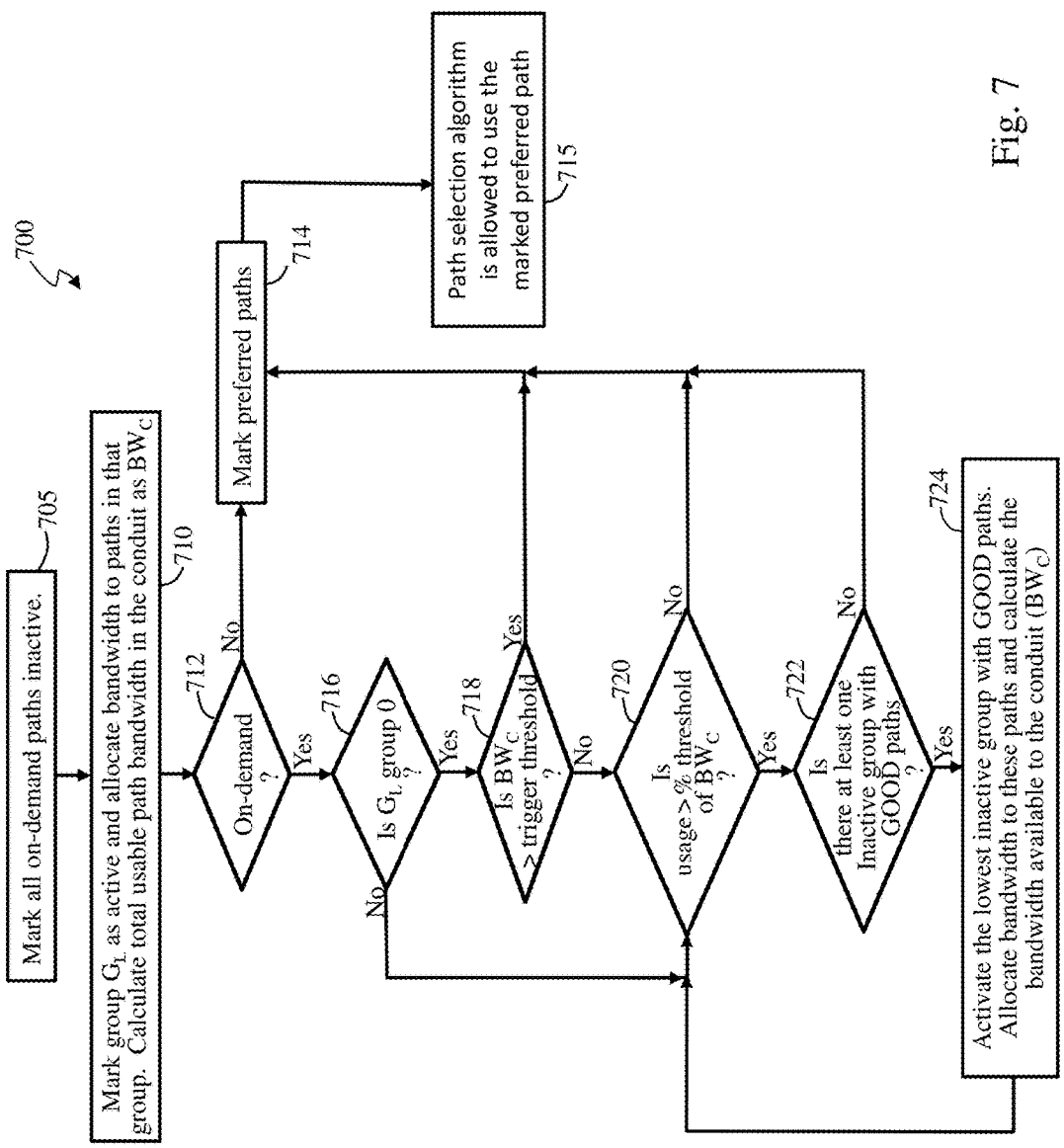
FIG. 7 illustrates an exemplary supplemental bandwidth determination process for activation and deactivation of standby backup paths in accordance with an embodiment of the present invention.

FIG. 7 illustrates an exemplary supplemental bandwidth determination process 700 for activation and deactivation of standby backup paths in accordance with an embodiment of the present invention. The supplemental bandwidth determination process 700 covers the identification of on-demand backup paths that are to be either activated or deactivated. Each time the process 700 runs, the algorithm determines what the best set of WAN links is, based on the bandwidth usage and network quality according to the state of the paths. The output of block 714 of the process 700 is the best set of WAN links that can be used to meet the needed bandwidth. Generally, the best set of WAN links output by block 714 is provided sequentially as paths are evaluated according to the trigger bandwidth threshold and the usage threshold. The best set of WAN links may include on-demand backup paths in which case they are activated by a path selection algorithm, see path selection algorithm of block 715 as described below, and may cause previously activated on-demand backup paths to be deactivated if the bandwidth they were supplying is no longer needed, also according to the path selection algorithm of block 715.

As previously described above, a conduit typically makes use of several WAN links and multiple conduits may use a given WAN link. The manner in which a conduit uses a specific WAN link is referred to in terms of usage. While a conduit service spans multiple WAN links, a conduit usage specifies how a single conduit uses a single WAN link. Activating a conduit usage on a WAN link enables all of the paths that conduit has on that WAN link. Thus, enabling a WAN link of last resort could result in multiple paths being enabled. The process 700 is selected to run every predetermined period, such as every 100 ms, as indicated by a timer. At block 705, all on-demand paths are marked inactive even if a previous execution of the process 700 marked an on-demand path as a preferred path and thereby activated for path selection. If the previously activated on-demand path is still required, the process 700 after block 705 reactivates the path. At block 710, a path group $G_L$ is marked active, and bandwidth is allocated to paths in that group. A total usable path bandwidth in the conduit is calculated by an egress processor as $BW_C$. In one exemplary embodiment, the calculation of $BW_C$ is the summation of the bandwidth available on the active paths. At decision block 712, a determination is made whether a selected path group comprises on-demand backup paths. The user's configuration determines which paths are on-demand backup paths. For example, the user is able to specify the type of path on the WAN link and the specified configuration is propagated to paths that use that WAN link. Blocks 720, 722 and 724, described in more detail below, iterate through path groups and activate paths to allocate enough bandwidth as needed to service the conduit. If the determination at block 712 is that the selected path group does not have an on-demand path, the process proceeds to block 714. At block 714, the selected path is marked a preferred path. All preferred paths are active paths, but not all active paths are preferred. A path is active if it is intended to carry traffic. An active path with good quality, such as being in the GOOD state and having sufficient bandwidth, is marked preferred. Preferred paths are the first choice for carrying traffic. Each path on the conduit is examined and the bandwidth rate is calculated for each path. If a path's rate is over 40 kbps, for example, and the path is GOOD, then the path is marked as PREFERRED which means that at block 715, the path selection algorithm is allowed to use the marked preferred path. The path selection algorithm examines network characteristics of the available paths when processing a packet.

Returning to decision block 712, if the selected path group has an on-demand path, the process 700 proceeds to decision block 716. At decision block 716, a determination is made whether the group $G_L$ is group zero. If the group $G_L$ is not group zero, the process 700 proceeds to decision block 720. If the group $G_L$ is group zero, the process 700 proceeds to decision block 718. It is noted that the supplemental bandwidth determination process 700 works by trying to add bandwidth through activation of standby paths, block 715, until there is enough bandwidth to meet a user's configured requirement as determined at decision block 718. If the configured requirements cannot be met, as indicated by decision block 718 following the No path, then paths are activated until the traffic usage is less than the usage threshold, such as less than 80% of the bandwidth being supplied ($BW_C$) as determined at block 720.

Returning to decision block 718, a determination is made whether the available $BW_C$, provided by active GOOD/BAD paths in a set of lower groups, is greater than the trigger threshold. If available $BW_C$ is greater than the trigger threshold, the process 700 proceeds to block 714 and marks the selected path a preferred path. If available $BW_C$ is not greater than the trigger threshold, the process 700 proceeds to decision block 720. At the decision block 720, a determination is made whether usage of the selected path is greater than a usage threshold, such as 80%, for example, of the bandwidth being supplied, where $BW_C$ is the bandwidth being supplied by the active paths. The process 700 at decision block 720 compares the $BW_C$ with the current bandwidth usage. If the usage of the selected path is not greater than 80%, the process 700 proceeds to block 714 and marks the selected path a preferred path. If the usage of the selected path is greater than 80%, the process 700 proceeds to decision block 722.

At decision block 722, a determination is made whether there is at least one inactive group with GOOD paths. If there is not at least one group with GOOD paths, the process 700 proceeds to block 714 and a BAD path is selected and marked a preferred path. This path selection algorithm generally leans toward a path having the most bandwidth. If there is at least one group with GOOD paths, the process 700 proceeds to block 724. At block 724, the lowest inactive group with GOOD paths is activated and bandwidth is allocated to these paths and the bandwidth available to the conduit (BW$_C$) is calculated. Activating a WAN link provides a pool of bandwidth available to a set of paths that use that WAN link. Since the APN system relies on reserving bandwidth for different uses and balancing that use against demand, a predetermined amount of bandwidth is allocated to paths that are to be used. Since the bandwidth allocation algorithm runs every 100 ms, the allocation amount that is provided in block 724 is generally changed very quickly and initially serves as a starting point for the allocated bandwidth. For example, a minimum amount of bandwidth, such as 24 kbps, is initially allocated to a path. Then the bandwidth allocation algorithm allocates additional bandwidth to the path in a predetermined specific manner. For example, the first path in a list of good paths in the lowest inactive group with GOOD paths is allocated as much bandwidth as it can use, the second path in the list is allocated as much bandwidth as it can use of the remaining bandwidth available for allocation, with the third path and follow-on paths continuing the bandwidth allocation in this manner until no more bandwidth is available for allocation. This described allocation process is not limited to this specific example, but is exemplary of a bandwidth allocation process sufficiently adequate for the purposes of block 724.

The process 700 then returns to decision block 720. The process 700 returns to decision block 720 because the only time that the "BW$_C$>trigger threshold" check is considered is if there are regular active WAN links available, as indicated by the determination that the group G$_L$ is zero at decision block 716. The trigger threshold represents a decision point whether to activate standby WAN links to supplement regular active links, but once there are no regular active links, such as after the process 700 reaches block 724, then the trigger threshold no longer matters and the process 700 uses as many standby links as necessary to provide bandwidth to service the conduit. This is also the reason why the "No" decision path of decision block 716 goes to the decision block 720.

Using the ship-to-shore communication network 300 of FIG. 3, an exemplary network configuration is configured as shown in Table 3 to provide an implementation scenario for use of the invention, though the invention is not limited to this exemplary configuration.

The exemplary network configuration of Table 3 for the ship-to-shore communication network 300 of FIG. 3 also includes in the APN, one network control node (NCN) at the data center 304 and three client appliances on two ships, 310 and 314.

There are an equal number of WAN links at each site, 304, 310, and 314. All of the WAN links are of private intranet type. In this example, all links are point-to-point with no mesh paths. The path groups, priority, associated paths, and path type are shown in Table 4.

TABLE 4

| Path Group | Priority | Paths | Path Type |
|---|---|---|---|
| 0 | 0 | 1, 2, 3, 4, 5, 6 | regular |
| 1 | 2 | 7, 8 | on-demand |
| 2 | 4 | 9 | last-resort |

In path group activation, when a backup path group becomes active, all paths in the backup path group become active. When a backup path group becomes active, the use state of the paths in a backup path group are determined in a similar way as the paths in a regular path group. For example, when the path group 1 of the ship-to-shore communication network 300 becomes active both paths 7 and 8 become active and available for supplementing the bandwidth of the conduit, though only one path may be needed at the time of the activation.

The standby WAN links support configurable heartbeat intervals. A heartbeat is a TRP control message with no data. The heartbeat message is sent for a path whenever a period of time has elapsed since a last packet sent is greater than the heartbeat interval currently set on the path. For active paths, the interval is normally 50 ms, for example. So, if the software sees 50 ms pass by with no user traffic, then a heartbeat message is generated and transmitted. When a path is standby, there is no user data so heartbeats are sent at an interval configured by the user. The purpose of the heartbeat is to maintain connectivity on the path and measure one way time, jitter, and loss when there is no other traffic using the path. To conserve link usage costs, the heartbeat interval of the ES WAN links for backup paths is set to one second by default and allows the interval to be configured. For example, a user can configure a heartbeat interval for backup paths from zero to ten seconds via a configuration editor, with the zero setting indicating heartbeat is disabled. When a backup path is in a standby mode and the user configured heartbeat interval is non-zero, the user configured heartbeat interval is used. Once the backup path is active, the heartbeat interval is set to be the same as that of a regular path. When a back up path transitions to a DEAD state, the heartbeat interval is reset to the configured interval. DEAD is a state that means the network quality of the path makes this path unusable.

TABLE 3

| Shore 304 Links | Shore 304 Priority | Shore 304 Regular/ Standby | Paths | Ship 310 and 314 Regular/ Standby | Ship 310 and 314 Priority | Ship 310 and 314 Links | Ship 310 and 314 On-demand/ Last-resort |
|---|---|---|---|---|---|---|---|
| LTE | 0 | R | 1 | R | 0 | LTE | regular |
| LTE | 0 | R | 2 | R | 0 | LTE | regular |
| LTE | 0 | R | 3 | R | 0 | LTE | regular |
| LTE | 0 | R | 4 | R | 0 | LTE | regular |
| LTE | 0 | R | 5 | R | 0 | LTE | regular |
| VSAT1 | 1 | S | 6 | S | 1 | VSAT1 | on-demand |
| ALT1 | 2 | S | 7 | S | 2 | ALT1 | on-demand |
| ALT2 | 2 | S | 8 | S | 2 | ALT2 | on-demand |
| STBY | 3 | S | 9 | S | 3 | STBY | last-resort |

When a backup path has a configured heartbeat interval of zero, no heartbeats are sent while in standby mode and the backup path state is considered always GOOD while the path remains in standby. When such no-probe path becomes active, the heartbeat interval is set to the normal active path's interval of 50 ms in the GOOD state and 25 ms if the backup path goes to a BAD state. If the active no-probe path becomes DEAD, the heartbeat interval is returned to no probing after 5 minute holdoff to avoid repeated path state changes. The intention here is to prevent path group activity from oscillating between a lower path group with assumed good DEAD paths and a higher path group with actual GOOD paths. If a backup path is formed between two ES WAN links each with different configured heartbeat intervals that are non-zero, the larger interval is used on both send and receive paths. If at least one of the two links has a zero configured heartbeat interval, the heartbeat is disabled for both send and receive paths.

Currently, every pre-specified period, such as a 100 ms period, on a WAN egress appliance, the amount of bandwidth allocated for each conduit user of each WAN link is adjusted based on the WAN link configuration data and the real time network conditions. Once adjusted, allocation of bandwidth to paths in each conduit takes place. If GOOD paths exist in the conduit, as much bandwidth as possible is allocated to them. If only BAD paths exist, the reference path is allocated as much bandwidth as possible first, before the remaining bandwidth is allocated to the other BAD paths. To support on-demand bandwidth enhancement, once bandwidth allocation to GOOD/BAD paths is complete, a determination is made whether an additional on-demand backup path group should be activated or the most currently activated on-demand backup path group be deactivated.

If the following conditions are met, an on-demand backup path group is activated at block 715. First, the bandwidth provided by the active GOOD/BAD paths in the conduit at a time that bandwidth is being evaluated is determined to be below the configured trigger bandwidth threshold, decision block 718. The system evaluates what happened over the last 100 ms period from the last evaluation of the bandwidth, for example. This first condition means that the conduit is close to using all of the available bandwidth specified for that conduit. The available bandwidth is the sum of the bandwidth that can be provided to the conduit over all of the active GOOD/BAD paths. Second, a determination is made whether there is sufficient bandwidth usage of the conduit that justifies additional bandwidth be added beyond what is supplied by the active GOOD/BAD paths at the time, such as having 70% of the bandwidth of the conduit being supplied by the active paths, decision block 720. In most cases, having between 50% and 80% of the bandwidth of the conduit being supplied by the active paths is a reasonable range that is used. The percentage varies depending on configuration and traffic patterns encountered. Usually a default number, such as the 70% value, is selected as a reasonable value in most cases. Then, an on-demand backup path group is activated to increase the available bandwidth of the conduit.

Once an on-demand backup group is activated, if any of these following conditions are met, an on-demand backup path group is deactivated. A first condition, see decision block 718 discussion above, is that the bandwidth provided by the active GOOD/BAD paths in a set of lower groups at the time is above the configured bandwidth threshold, if met an on-demand backup path group is deactivated. For example, if a set of less costly WAN links can satisfy the required bandwidth, then an on-demand backup path group will end up deactivated. A second condition, see decision block 720 above, is that the bandwidth usage of the conduit is above the specified threshold, such as having 80% of bandwidth of the conduit being supplied by the active paths, if the bandwidth from the group were removed. If the bandwidth usage is below the specified threshold, such as the 80% threshold, then the on-demand backup path group is deactivated. Same percentage used for activation and deactivation. A third condition is that at least one path in the on-demand path backup path group is active. If these conditions are met, the on-demand backup path group is deactivated.

If an on-demand backup path group is activated or deactivated, allocation of bandwidth to paths take place a second time to include or exclude the newly activated or deactivated backup paths. In addition, a quality report (QR) is sent by the egress appliance to the ingress appliance, so that the backup paths are added to or removed from the forwarding path pool.

If the need for more bandwidth persists, more on-demand backup path groups are activated later, one at a time in the order of increasing cost. Likewise, when the bandwidth usage no longer justifies the activation of backup path groups, the activated standby paths are deactivated, one at a time in the order of decreasing cost.

The hysteresis effect is built in the design, so activation and deactivation of on-demand backup path groups do not hover over a single configured threshold. A hold time of a predetermined period, such as ten seconds, is set to provide a waiting period between an activation or a deactivation and making another evaluation on whether to activate another on-demand backup path group or to deactivate a most currently activated on-demand backup path group. The hold time of the waiting period is determined to minimize effects bursty traffic could have on the activation and deactivation processes. The hysteresis effect also ensures that activation and deactivation of on-demand path groups is spaced far enough apart in time to avoid the situation where quality reports (QRs) are queued up on the egress appliance waiting to be sent to the ingress appliance because the maximum allowed QRs have been sent within a current time period. For example, a limit may be set for QRs such as a specified limit of no more than eight QRs per second. Activating a backup WAN link requires sending a QR so that the other side of the conduit knows that the activated backup WAN link can be used. If activation and deactivation occur too quickly, then there could be a build up a relatively large number of QR messages that should be sent, but they are held up by the QR rate limiting. This would cause the two ends of the conduit to be out of sync regarding which WAN links should be used. By spacing activations and deactivations apart far enough in time, the buildup of QRs and having the two ends of the conduit being out of sync are avoided.

As described in the previous section, when a conduit's need for more bandwidth persists, it is possible that multiple backup path groups are activated at the same time to supplement bandwidth for the conduit. In that situation, a forwarding path pool includes not only regular paths, but also multiple active backup path groups. During path selection, a forwarding plane chooses the least cost path to forward a packet. The cost is represented by the amount of time to deliver a packet and is calculated as a sum of reported path latency, local WAN link scheduler wait time, and remote WAN link scheduler wait time.

Note that the path cost calculation in the forwarding plane generally does not take into account the real operating cost of the WAN links. Under an assumption that an activated backup ES WAN link costs more to operate than the regular WAN links and it is desirable to favor paths that cost less to operate, a penalty of time cost can be added to active backup paths. As a result, active backup paths that use ES WAN links with a higher configured cost and have a higher time cost in the path selection process. This penalty of added time cost to the backup paths tends to shift the selection process toward regular paths and lower cost backup paths.

The standby path group information is part of the configuration data passed to t2_apps 187 and 189 via registry for each egress path in a conduit, respectively. Since the t2_app requires knowledge of whether a backup path is on-demand or last-resort, an on-demand indicator is added to an egress path registry. The on-demand indicator is on when either the local or remote WAN link is an on-demand standby WAN link. The on-demand indicator is off when either the local or remote WAN link is a last-resort standby WAN link. Paths with the on-demand indicator off are not activated to supplement bandwidth to a conduit. They are used as last-resort.

Using the ingress and egress fair share rates of the conduit and the configured percentage trigger bandwidth threshold, corresponding to decision block 718 of FIG. 7, in a user-created conduit default set, the compiler calculates the WAN ingress and WAN egress threshold rates for either end of the conduit and adds them to the registry. The customer configures the value used in decision block 718 as a percentage of the available conduit bandwidth, then the system compiler translates the configured value into a bandwidth threshold and the algorithm compares the available conduit bandwidth, BW against that threshold. These threshold rates are used by t2_app to activate and to deactivate on-demand backup paths in the conduit.

An audit error is generated if there is at least one on-demand ES WAN link in a conduit and the trigger bandwidth threshold for the on-demand ES WAN link is not set. No audit is needed if the trigger bandwidth threshold is configured, but no on-demand standby WAN links are configured. An audit is also needed if a remote site's WAN egress threshold rate does not match the local site's WAN ingress threshold rate, or the remote site's WAN ingress threshold rate does not match the local site's WAN egress threshold rate. This mismatch can occur if different ends of a conduit use different percentages because different default sets are used.

Monitor statistics include a separate table under WAN link usages for on-demand standby WAN links. This table does not show up if no on-demand WAN links are configured. The following statistics may be shown, including a total conduit usage statistic for each conduit and the bandwidth at which stand-by WAN links are triggered. The conduit usage is the total of all the regular WAN link usages. The statistic covers both send and receive. A second statistic includes individual WAN links including regular WAN links and their usage. A third statistic includes a standby WAN link type, such as on-demand or last-resort. A fourth statistic includes the standby WAN links that are in use or not in use.

As described above, having knowledge about WAN link bandwidth in an APN is an important aspect to be used by network administrators and users for adjusting system operation. For example, many clients require information on how much bandwidth can actually be obtained to transfer information from a branch office WAN link to a data center, where the NCN is likely located. To this end, a user administered bandwidth test capability to measure and verify the WAN link bandwidth is described below.

The bandwidth testing across the APN advantageously includes testing for public Internet WAN link paths, MPLS queue paths, and paths between multiprotocol label switching (MPLS) WAN links with different differentiated services code point (DSCP) tag settings. Manual and automatic bandwidth testing can be configured between a user site and an NCN under user control. The automatic test can be configured by the user to run scheduled periodic bandwidth testing. Past bandwidth test results are stored and can be displayed for comparison with current bandwidth results.

To test the bandwidth of a path, a sequence of N packets of the same length L in bytes are sent on the path. The packets are known as bandwidth test packets. Those packets are sent as control test packets on the path, so they jump ahead of other user packets, and most likely they will be sent out back-to-back. The system can use the receive time of packets to calculate bandwidth. The send time values are used to do some sanity checking and throw out bad measurements. For example, if the send time difference between the first and Nth packet is larger than the receive time difference between the first and Nth packet, then packets arrived faster than they were sent so the bandwidth measure is likely wrong. This scenario can happen if there is temporary queueing in the network that causes the packets to arrive in a burst.

When the packets are received at the path egress side, the packets will be scattered out in terms of arrival times. The packets were inserted into the network back to back at the rate of the local Ethernet LAN. The WAN link bandwidth is generally slower than that of the Ethernet LAN, so the gap in time when the packets get received by the far end generally reflects the bandwidth of the WAN. The receive time difference between the Nth packet and the first packet, N−1, is Delta_out micro seconds (us). In an ideal situation when there is no loss, no jitter, no congestion, and no out-of-order packets (OOO), then the path bandwidth is determined by the egress processor module 164 or 166 at the path end point using equation 1 (equ. 1):

$$\text{path bandwidth } B \text{ (kbps)} = (N-1)*L*8000/\text{Delta\_out (us)} \quad \text{equ. 1}$$

The value 8000 comes from converting the units of L (bytes) and Delta_out (us) to the bandwidth in kbps. The path bandwidth is also the smallest link bandwidth along the path. If a path includes multiple links, the link with the smallest bandwidth limits the total path bandwidth.

The path bandwidth test sends out a small burst of test packets, the N packets, so that no special bandwidth reservation is needed. For example, with an NCN connected to clients 1, 2, 3, and 4, a bandwidth test is configured to measure the client 1 WAN link 2's ingress bandwidth using path client 1 WL2 to NCN WL2. At the same time, the system is sending user traffic from the four clients to the NCN. There is no impact to the test result when there is no bandwidth reservation. Jitter, OOO, loss, tends to increase the average receive time interval between two consecutive packets. This increase causes the measured bandwidth to decrease.

Packet loss is expected to be low due to the short packet bursts except if the path is bad. If packet loss happens before the smallest link on the path, the measured path bandwidth shouldn't be impacted. If packet loss happens after the packets pass through the smallest link on the path, then the measured path bandwidth will be smaller than actual path bandwidth, as shown in equation 2.

$$B\_\text{measured} = B\_\text{actual}*(1-\text{percent\_of\_loss}) \quad \text{equ. 2}$$

For each path bandwidth test, a specified number of test sequences, such as ten sequences of tests, are run. After each test sequence, the system waits to receive the results which gives the path time to recover. If in the test, there are test sequences with no loss, and also test sequences with certain loss, the test result can be adjusted to account for the loss. Jitter and OOO can also impact test results. In this case, the adjustment due to receiving an OOO packet with extreme large receive time interval with previous packet is to exclude this data from the test result calculation.

In another embodiment, the first time a test is run on a path, eleven sequences of traffic are sent on the path. The first burst is to send ten packets to determine how large the path bandwidth may be. Then, each burst of traffic following the first sequence is to approximate a specific time period of traffic, such as twenty milliseconds (ms) of data for the path. The specific time period is chosen to be small enough to not disturb most time sensitive traffic too much, and may be determined experimentally. The number of packets to send is determined by the ingress processor module at the path beginning point using equation 3:

$$\text{Packets to send} = \text{path bandwidth (kbps)} * 20 \text{ ms}/(8*\text{bytes/packet}) \quad \text{equ. 3}$$

The number of packets to send generally is between 10 packets and 100 packets. For each burst of traffic, at WAN ingress, the determined number of packets are sent back to back. Each of those packets have a special header, a sequence number, and a timestamp when they are sent. Those packets are also time stamped when they are received at the other end of the path. When a first packet in a sequence of packets is received, the first send time and first receive time are recorded and the packet received and bytes received are also recorded. Statistics are gathered for subsequent packets. When the bandwidth test sends a burst of packets to a remote WAN link, it is possible that the remote link could receive client data packets from other services intermixed with the bandwidth control test packets. Since it is known that those intermixed packets consumed bandwidth on the remote WAN link, it may be useful to count that as bandwidth.

If testing is to determine how much data can be sent from a small bandwidth link to a large bandwidth link, where large means its bandwidth is more than double the small bandwidth link, then counting intermingled client data packets artificially inflates the small links bandwidth number. In that case, only those special bandwidth control test packets are counted.

Otherwise, all packets received on the destination WAN link are counted and the bytes received will be updated. Since there can be other user traffic packets that are received into the small destination WAN link, these packets have an impact on the test result. Before the statistics for every packet are updated, the packet one way time is checked and compared to the last reported one way time of the path. If the one way time is off by a prespecified amount from the last reported one way time, this packet is not counted and the statistics collected for bandwidth calculation are not updated.

For every valid bandwidth test packet that is received, the last send time, the last receive time, the number of bytes received is updated and a copy of the bytes received is saved. This approach is used to make sure if any test packets are lost, there still is good data. The bandwidth test sends a small burst of 10 to 100 packets. If some of those packets are lost, it is still possible to use the data from the packets that made it to calculate the bandwidth. It may be less accurate, since it is not known where or why the packet or packets were lost. The system waits until all test packets are received or until 200 ms has passed. Whether all test packets have been received can be determined from each test packet since the packet contains how many packets are to be sent and the sequence number of the packet. This process is followed for the case when some test packets get lost and are never received. If packets are lost, the data is adjusted to calculate the test result.

$$\text{Bandwidth(kbps)} = \text{total bytes rcvd} * 8000/((\text{last receive time} - \text{first receive time}) \text{ in usec}) \quad \text{equ. 4}$$

where the last receive time is for the last packet and the first receive time is for the first packet.

Figure 8A:
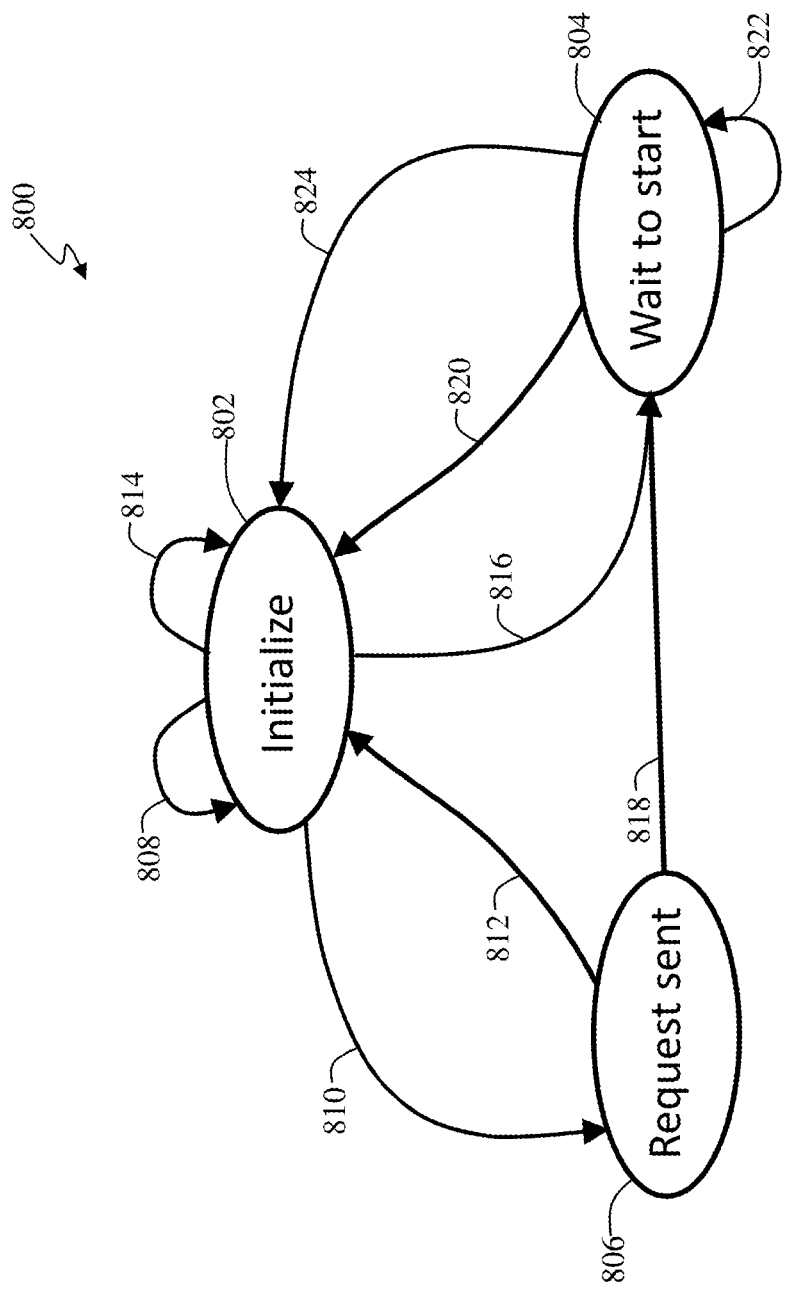
FIG. 8A illustrates a WAN ingress bandwidth test state machine in accordance with an embodiment of the present invention.

FIG. 8A illustrates a WAN ingress bandwidth test state machine 800 in accordance with an embodiment of the present invention. The WAN ingress bandwidth test state machine 800 includes an initialize state 802, a wait to start state 804, and a request sent state 806. The transitions between the states are shown in Table 5:

TABLE 5

| Transition | Ingress Site 1 Bandwidth Test State Machine Transition Description |
|---|---|
| 808 | User Interface (UI) path test request, reserve WAN link (WL) fails |
| 810 | UI path test request, reserve WAN link success, send request, start WL release timer T0 |
| 812 | Timer T0 expires or Receive NACK, release WL reservation, return error to user |
| 814 | Receive path test request from remote site, reserve WL fails, send NACK |
| 816 | Receive path test request from remote site, reserve WL success, send ACK, start WL release timer T0 |
| 818 | Receives test results with successful test count 0, rate 0, send 10 test packets, restart T0 |
| 820 | Timer T0 expires, release WL reservation, return error to user if UI request pending |
| 822 | Receive test results with successful test count less than N + 1, send test packet, restart T0 |
| 824 | Receive test result with successful test count N + 1, release WL reservation, stop T0, store result in database, return results to user |

Figure 8B:
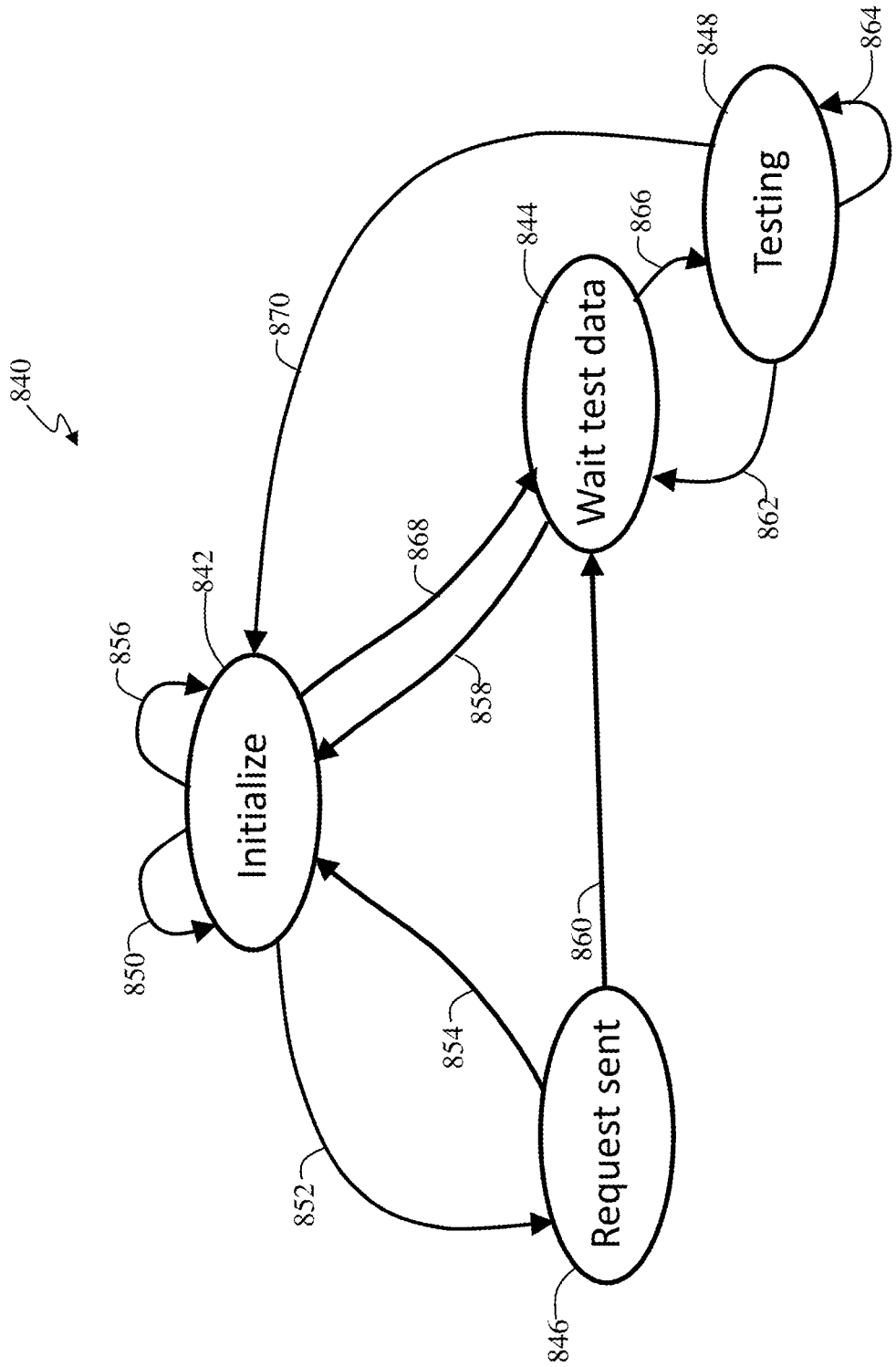
FIG. 8B illustrates a WAN egress bandwidth test state machine in accordance with an embodiment of the present invention.

FIG. 8B illustrates a WAN egress bandwidth test state machine 840 in accordance with an embodiment of the present invention. The WAN egress bandwidth test state machine 840 includes an initialize state 842, a wait test data state 844, a request sent state 846, and a testing state 848. The transitions between the states are shown in Table 6:

TABLE 6

Transition Egress Site 2 Bandwidth Test State Machine Transition Description

| Transition | Description |
|---|---|
| 850 | UI path test request, reserve WAN link (WL) fails, return error to user |
| 852 | UI path test request, reserve WAN link success, send request, start WL release timer T0 |
| 854 | Timer T0 expires or Receive NACK, release WL reservation, return error to user |
| 856 | Receive path test request from remote site, reserve WL fails, send NACK |
| 858 | Timer T0 expires, release WL reservation, return error to user if test requested from UI |
| 860 | Receive ACK, restart timer T0, send test result with success count: 0, rate: 0 |
| 862 | Timer T1 expires or get all test data, calculate result, not done all tests, send test result to remote site to trigger new test |
| 864 | Packet is received and counted |
| 866 | Receive test data packet, stop T0, start result timer T1, start statistics collecting |
| 868 | Receive path test request from remote site, reserve WL success, start WL release timer T0, send test result with success count: 0, rate: 0 |
| 870 | Timer T1 expires or get all test data, calculate result, done all tests, release WL reservation, send result to user or remote site |

For transition 854, the WL reservation is an internal locking mechanism used to make sure there is only one bandwidth test running at a time on a WAN link under test.

Figure 9A:
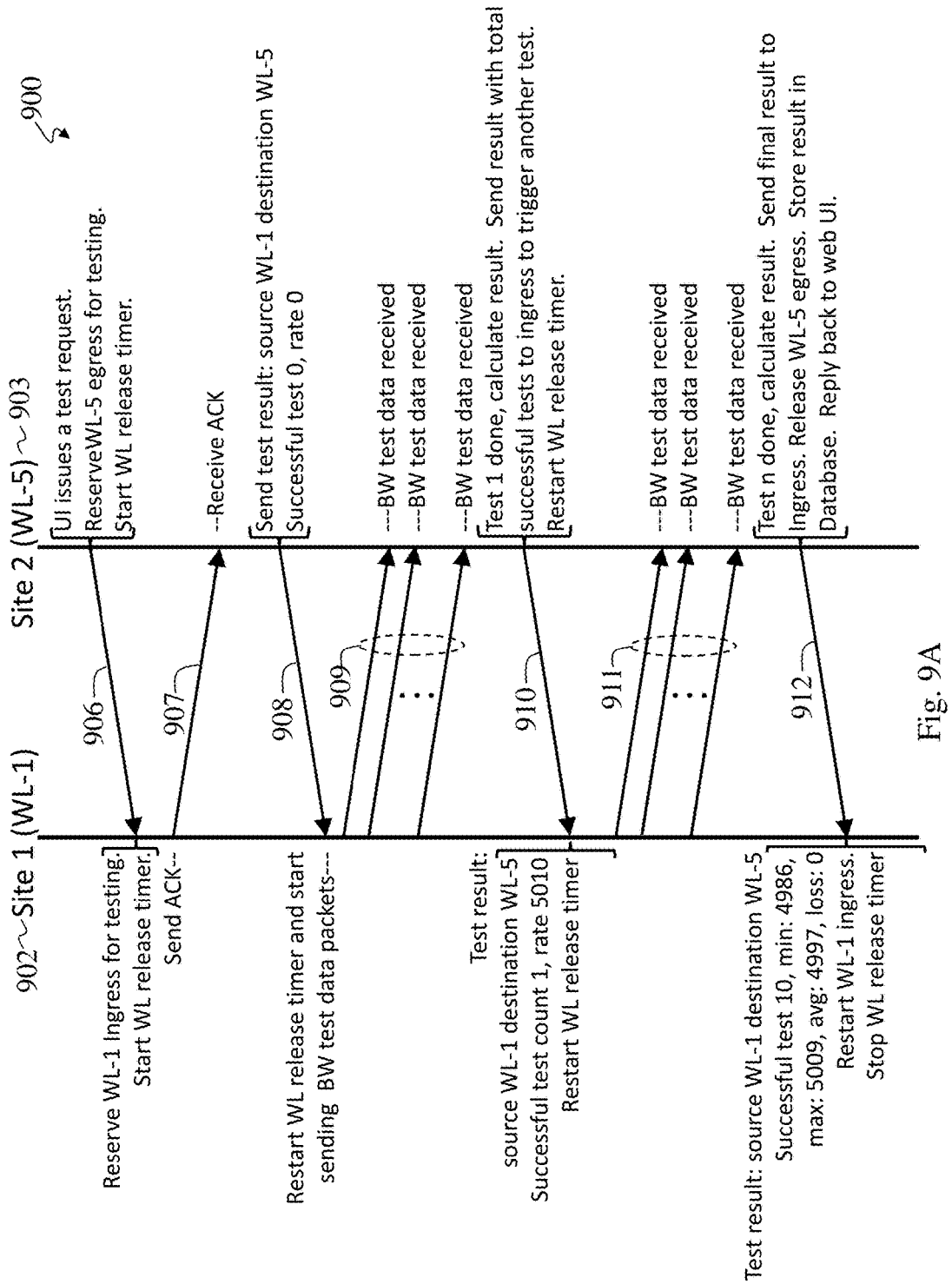
FIG. 9A illustrates WAN ingress path transfers for bandwidth testing between a site 1 and a site 2 in accordance with an embodiment of the present invention.

FIG. 9A illustrates WAN ingress path transfers 900 for bandwidth testing between a site 1 902 and a site 2 903 in accordance with an embodiment of the present invention. Reference is made to the WAN ingress processor module 160 and the WAN egress processor module 166 of FIG. 1B and to the transitions of FIGS. 8A and 8B and Tables 5 and 6. The WAN ingress path bandwidth test message flow begins with step 1 below.

1. A user request is issued at site 2 903. Site 2 903 issues a WAN ingress path test request and checks to see if the WAN egress processor module 166 for WAN link 5 is already in use for testing. If yes, site 2 903 is busy, a reply with an error message is sent to the user at site 2 903 and the path test request fails, corresponding to transition 850 in FIG. 8B and Table 6. Otherwise, the site 2 903 reserves the WAN link 5 egress for testing and sends the test request across transfer 906 to site 1 902. Site 1 902 checks to see if the WAN ingress processor module 160 for WAN link 1 (WAN link 1 ingress) is already in use for testing. If yes, site 1 902 is busy, a reply with an error message is sent to site 2 903 and the path test request fails, corresponding to transition 814 in FIG. 8A and Table 5. Otherwise, the site 1 902 reserves the WAN link 1 ingress for testing and starts WL release timer at site 1 902, corresponding to transition 810 in FIG. 8A and Table 5. The site 1 902 sends an ACK across transfer 907 to the WAN egress processor module 166 for link 5 at site 2 903. The test request includes a test source WAN link ID, a test destination WAN link ID, and a test id. In site 1 902, if a no acknowledgment (NACK) is received or no ACK received from site 2 903 when the WL release timer expires, the path test is aborted, corresponding to transition 812 in FIG. 8A and Table 5.
2. Upon site 2 903 receiving the ACK, the site 2 903 sends a first test result message packet across transfer 908 to site 1 902 with a successfully tested count of 0 and a rate of 0 to trigger Site 1 902 to start sending test data packets.
3. When site 1 902 receives the first test result message packet, corresponding to transition 818 in FIG. 8A and Table 5, the Site 1 902 starts sending bandwidth (BW) test data packet using this path across transfers 909. The test and test result messages carry the source and destination WAN link ID numbers and that uniquely identifies this path. The configuration compiler assigns a unique ID to each WAN link in the network and both sites on a conduit know each other's WAN link IDs. Since the actual path bandwidth can be unknown, the first path test always sends 10 BW test data packets. Those packets are sent as special control packets which are sent directly to the network and shadows are placed in all schedulers to act as other control packets. Normally, packets that flow through a conduit are put through a scheduler to make sure the correct bandwidth usage is maintained. Control packets skip this scheduler, though, and are sent straight out to the network. To prevent overrunning the bandwidth of the conduit, a "shadow" packet is placed in the scheduler for each control packet. The "shadow" is a dummy packet that consumes bandwidth in the scheduler, but is never transmitted. The "shadow" simply makes space in the scheduler to account for the control packet that bypassed the scheduler.
4. At site 2 903, the first bandwidth test packets are received, and measurements are taken, such as set bandwidth test start_time_usec as packet local received time, clear packets_received, bytes_received. The site 2 903 starts updating those measurement statistics for every packet received. When the first bandwidth test packet is received, a timer is started, such as a 100 ms timer. For every bandwidth test data packet received, updates are made, such as, bandwidth test end_time_usec as packet local received time and total_bytes_received. Such updates are done so that even if a packet is lost, the receiving site 2 903 still has the right time for last test packet received time and the total test packets received at that time. When the 100 ms timer expires, calculate bandwidth with total_bytes_received*8/(end_time_usec−start_time_usec) Mbps. The path test generally won't take 100 ms to finish, however a sufficient time period is chosen to make sure the WAN link 5 egress receives all BW test packets, to also give the network time to recover from the burst introduced by testing, and to have time to prepare for a next round of testing. In case the path test is invalid, such as may occur if site 1 902 is really busy, and the BW test packets sent time difference between first and last is longer than 1 ms, then the test is invalid, corresponding to transition 820 in FIG. 8A and Table 5.
5. Site 2 903 sends the test result across transfer 910 to site 1 with a successful test count of 1. The test count is incremented by 1 when the test result message is sent.

So after the first bandwidth test, the test count is 1. After the second test, it is 2, and so forth.

6. Site 1 902 receives the test result, since the successfully test count is not N+1, the site 1 902 starts sending BW test data packets across transfers 911 again as listed in step 3, corresponding to transition 822 in FIG. 8A and Table 5. Just the total bandwidth test data packets sent are calculated as: total packets to send=bandwidth_kbps*20 ms*8/path_MTU bandwidth_kbps is the rate received in the test result packet. Total packets to send are also bounded to make sure the number of packets to send is between a range of 10 to 100.

7. Repeat steps 4 and 5.

8. At site 2 903, when all N+1 test results have been successfully calculated, site 2 903 calculates a final result from test 2 to N+1, and send the final result back to site 1 902 across transfer 912. Also site 2 903 stops the bandwidth release timer, releases WL-5 egress from testing, and replies back to web UI, corresponding to transition 824 in FIG. 8A and Table 5.

9. Site 1 902 upon receiving the final test result packet with successful test count N+1, the site 1 902 stops the bandwidth release timer, stores the results in a database.

Figure 9B:
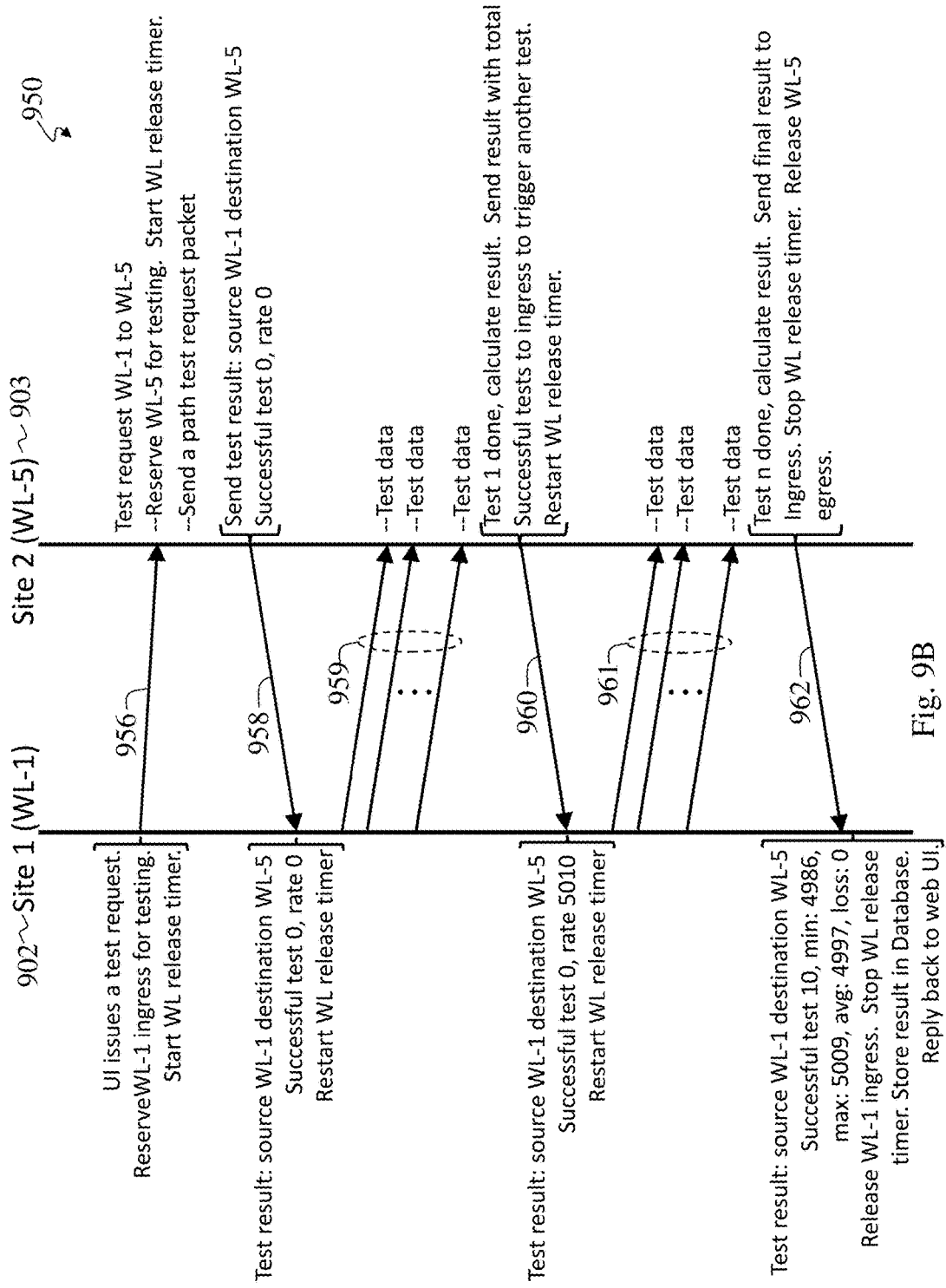
FIG. 9B illustrates WAN egress path transfers for bandwidth testing between a site 1 and a site 2 in accordance with an embodiment of the present invention.

FIG. 9B illustrates WAN egress path transfers 950 for bandwidth testing between a site 1 902 and a site 2 903 in accordance with an embodiment of the present invention. Reference is made to the WAN ingress processor module 160 and the WAN egress processor module 166 of FIG. 1B and to the transitions of FIGS. 8A and 8B and Tables 5 and 6. The WAN egress path bandwidth test message flow begins with step 1 below.

1. A user request is issued at site 1 902. Site 1 902 reserves WL-1, and if that fails, site 1 902 replies with an error message to the user. Otherwise, site 1 902 sends a WAN egress path test request across transfer 956 to site 2 903. Site 2 903 checks to see if the WAN egress processor module 166 for WAN link 5 (WAN link 5 egress) is available for testing. If not, a reply with an error message is sent from site 2 903 to site 1 902 and the path test fails, corresponding to transition 856 in FIG. 8B and Table 6. Site 1 902 upon receiving an error message from site 2 903, sends an error message to the user as transition 812. Otherwise, the site 2 903 reserves the WAN link 5 egress for testing and starts a WL release timer at site 2 903, corresponding to transition 852 in FIG. 8B and Table 6.

2. Site 2 903 sends a first test result message packet across transfer 958 to site 1 902 with a successfully tested count of 0 and a rate of 0 to trigger site 1 902 to start sending test data packets 959.

3. The rest of the processing steps for 960-962 of FIG. 9B are similar to ingress path bandwidth testing steps 910-912, respectively, as listed above regarding FIG. 9A.

If a user configured a WAN link to use the bandwidth test result, after a path bandwidth test between this WAN link and an NCN/geographically diverse NCN configured WAN link is done, the WAN link ingress or egress permitted rate is updated in a separate statistical database table which includes epoch time, WAN link name, WAN link ID, WAN ingress bandwidth (kbps), and WAN egress bandwidth (kbps). After a software update, also after reboot, t2_app restarts, the latest WAN link bandwidth can be used.

The WAN link permitted use rate is included in the QR, so every appliance can have the updated WAN link permitted rate.

Figure 10:
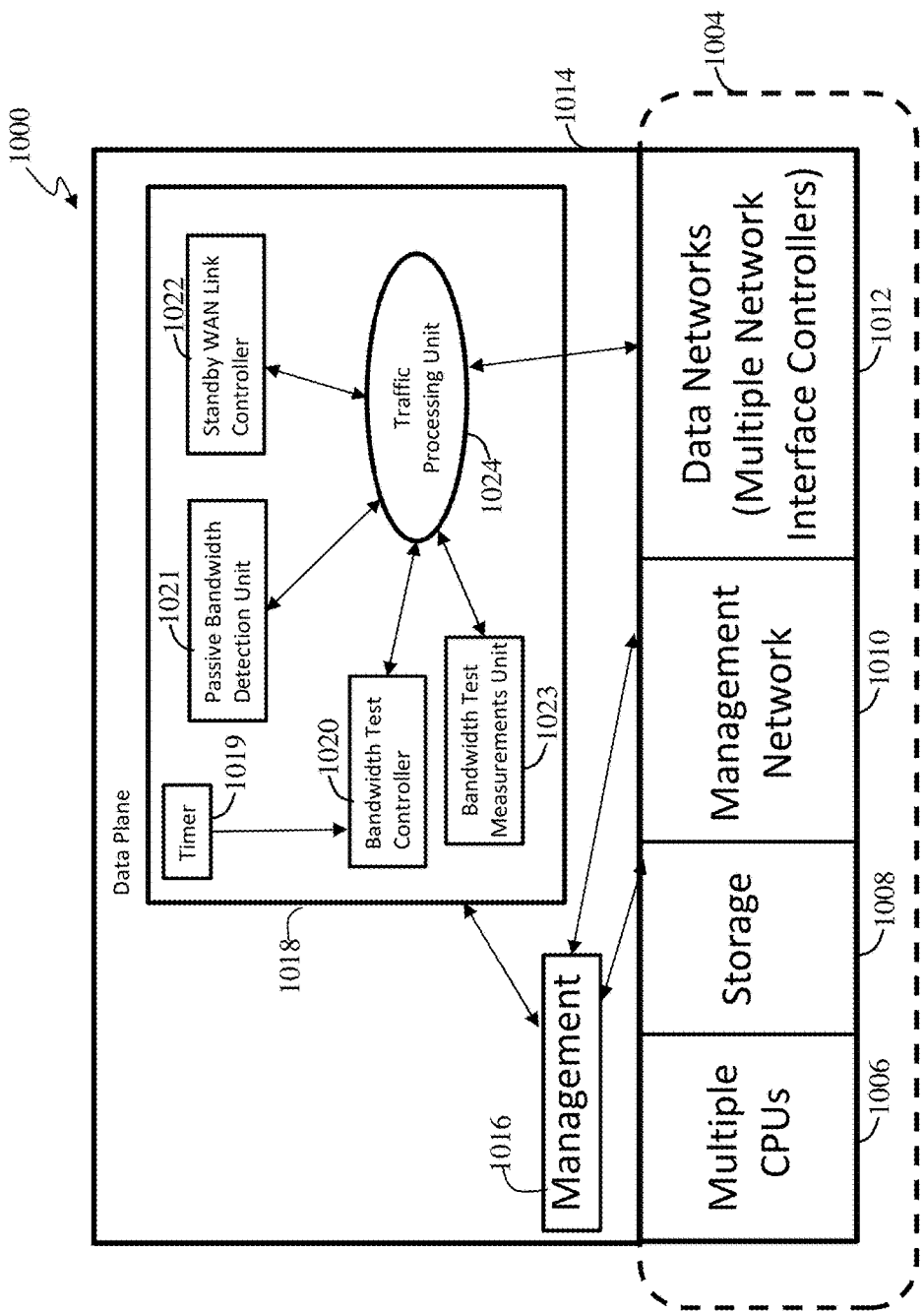
FIG. 10 illustrates an exemplary system architecture in accordance with an embodiment of the present invention.

FIG. 10 illustrates an exemplary system architecture 1000 in accordance with an embodiment of the present invention. The system architecture 1000 includes a hardware portion 1004 and software portions 1014. The hardware portion 1004 comprises multiple central processing units (CPUs) 1006 configured in a parallel processing arrangement. Storage 1008 is configured with fast access memory for program storage and for fast access data storage. A management network 1010 and a data network 1012, includes multiple high performance networks and interface controllers, provide software configurability and access to high performance networks, peripheral ports for external devices, and APNA devices. The software portion includes a management function 1016 and a data plane function 1018. The data plane function 1018 comprises a timer function 1019 that interfaces with a bandwidth test controller 1020, a passive bandwidth detection unit 1021, a standby WAN link controller 1022, a bandwidth test measurements unit 1023, and a traffic processing unit 1024. The management function 1016 interfaces with the data plane function 1018 and with the management network 1010 and storage 1008. The bandwidth test measurements unit 1023 and bandwidth test controller 1020 comprises the WAN ingress bandwidth test state machine 800 of FIG. 8A and the WAN egress bandwidth test state machine 840 of FIG. 8B. The bandwidth test controller 1020 controls the running of multiple tests, collecting the aggregate results, and interpreting the test measurements. The bandwidth test measurements unit 1023 is used to process received bandwidth test packets. The traffic processing unit 1024 interfaces with the data network 1012, the bandwidth test controller 1020, the passive bandwidth detection unit 1021, the standby WAN link controller 1022, and the bandwidth test measurements unit 1023. The software portion 1014 operates as described herein regarding FIG. 1A-FIG. 9B. The system architecture 1000 is designed to be scalable to support additional CPUs. For example, as noted above, the multi-threaded architecture of the t2_apps 187 and 189 of FIG. 1B allows platforms with multiple CPUs to spread the processing of a packet across the multiple CPUs, which allows performance of the software portion 1014 to scale as more CPUs are made available.

While the present invention has been disclosed in the context of various aspects of presently preferred embodiments, it will be recognized that the invention may be suitably applied to other environments consistent with the claims which follow.

We claim:

1. A method for automatically activating standby backup paths, the method comprising:

configuring an adaptive private network (APN) with a plurality of regular active wide area network (WAN) links and a first on-demand WAN link;

operating a conduit in the APN with the regular active WAN links in active mode and the first on-demand WAN link in standby mode, wherein the conduit includes a plurality of regular active paths for carrying user traffic between regular active WAN links located at different sites and an on-demand standby path between the first on-demand WAN link and another WAN link located at a different site from the first on-demand WAN link; and activating the first on-demand WAN link to supplement the conduit bandwidth in response to determining an available bandwidth comprising a sum of bandwidth that can be provided by all of the regular active paths of the conduit falls below a pre-specified trigger bandwidth threshold and a conduit bandwidth usage comprising a percentage of the available bandwidth being used exceeds a usage threshold.

2. The method of claim 1 further comprising:
configuring the APN with a last resort standby WAN link;
operating the conduit in the APN with the regular active WAN links in active mode, the first on-demand WAN link in active mode, and the last resort standby WAN link is standby mode; and
activating the last resort standby WAN link to provide conduit bandwidth in response to determining the other WAN links are dead.

3. The method of claim 1 further comprising:
deactivating the first on-demand WAN link to standby mode in response to determining an available bandwidth of the conduit is above the pre-specified trigger bandwidth threshold and the conduit bandwidth usage drops below the usage threshold.

4. The method of claim 3, wherein the trigger threshold, the usage threshold, and a waiting period hold time create a hysteresis effect for the activation of the first on-demand WAN link and the deactivation of the first on-demand WAN link.

5. The method of claim 1, wherein the trigger threshold acts as a gate keeper that must be passed to activate or deactivate the first on-demand WAN link.

6. The method of claim 1 further comprising:
configuring the APN with a second on-demand WAN link in standby mode and with the first on-demand WAN link deactivated to standby mode;
prioritizing the first on-demand WAN link with a higher priority than a priority set for the second on-demand WAN link, wherein the first on-demand WAN link has a higher cost to operate than the second on-demand WAN link; and
activating the second on-demand WAN link first having lower priority than the first on-demand WAN link before activating the first on-demand WAN link to further supplement the conduit bandwidth.

7. The method of claim 1 further comprising:
adding a time cost penalty to paths in the activated first on-demand WAN link, wherein the penalty of added time shifts a selection of paths toward a selection of less costly paths.

8. A method for automatically activating and deactivating standby backup paths, the method comprising:
operating a conduit in an adaptive private network (APN) with a plurality of regular active wide area network (WAN) links in an active mode and a first on-demand WAN link in a standby mode, wherein the conduit includes a plurality of regular active paths for carrying user traffic between regular active WAN links located at different sites and an on-demand standby path between the first on-demand WAN link and another WAN link located at a different site from the first on-demand WAN link;
activating the first on-demand WAN link to supplement the conduit bandwidth in response to determining an available bandwidth comprising a sum of bandwidth that can be provided by all of the regular active paths of the conduit falls below a pre-specified trigger bandwidth threshold and a conduit bandwidth usage comprising a percentage of the available bandwidth being used exceeds a usage threshold; and
deactivating the first on-demand WAN link to standby mode in response to determining the available bandwidth of the conduit is above the pre-specified trigger bandwidth threshold and the conduit bandwidth usage drops below the usage threshold.

9. The method of claim 8, wherein the trigger threshold, the usage threshold, and a waiting period hold time create a hysteresis between the activating of the first on-demand WAN link and the deactivating of the first on-demand WAN link.

10. A method for automatically activating and deactivating standby backup paths, the method comprising:
operating a conduit in an adaptive private network (APN) with regular active wide area network (WAN) links in an active mode and a first on-demand WAN link in a standby mode;
activating the first on-demand WAN link to supplement the conduit bandwidth in response to determining an available bandwidth of the conduit falls below a pre-specified trigger bandwidth threshold and the conduit bandwidth usage exceeds a usage threshold representing a percentage of bandwidth of the conduit that is being supplied by active paths; and
deactivating the first on-demand WAN link to standby mode in response to determining an available bandwidth of the conduit is above the pre-specified trigger bandwidth threshold and the conduit bandwidth usage drops below the usage threshold, wherein the trigger threshold, the usage threshold, and a waiting period hold time are chosen to create a hysteresis effect with the deactivation spaced far enough in time from the activation to minimize the queueing up of quality reports on paths in the conduit.

11. The method of claim 8 further comprising:
configuring the APN with a last resort standby WAN link;
operating the conduit in the APN with the regular active WAN links in active mode, the first on-demand WAN link in standby mode, and the last resort standby WAN link is standby mode; and
activating the last resort standby WAN link to provide conduit bandwidth in response to determining the other WAN links are dead.

12. The method of claim 8 further comprising:
configuring the APN with a second on-demand WAN link in standby mode and with the first on-demand WAN link in active mode prior to deactivating the first on-demand WAN link to standby mode;
prioritizing the second on-demand WAN link with a lower priority than a priority set for the first on-demand WAN link, wherein the first on-demand WAN link has a higher cost to operate than the second on-demand WAN link; and
prior to deactivating the first on-demand WAN link, activating the second on-demand WAN link having a lower priority than the first on-demand WAN link to use both the first and second on-demand WAN links to supplement the conduit bandwidth.

13. The method of claim 8 further comprising:
adding a time cost penalty to paths in the activated first on-demand WAN link, wherein the penalty of added time shifts a selection of paths toward a selection of less costly paths.

* * * * *